United States Patent [19]
Goldberg et al.

[11] Patent Number: 5,963,203
[45] Date of Patent: Oct. 5, 1999

[54] INTERACTIVE VIDEO ICON WITH DESIGNATED VIEWING POSITION

[75] Inventors: Cihl Mozest Goldberg, Les Baux de Provence, France; Nabil Madrane, Cassablanca, Morocco

[73] Assignee: Obvious Technology, Inc., Menlo Park, Calif.

[21] Appl. No.: 08/887,992

[22] Filed: Jul. 3, 1997

[51] Int. Cl.$^6$ .................................................. G06F 3/00
[52] U.S. Cl. ......................... 345/328; 345/355; 345/349; 345/976
[58] Field of Search .................................. 345/326–358, 345/976, 977, 473–475, 127, 131, 302, 439; 348/699, 700

[56] References Cited

U.S. PATENT DOCUMENTS

| | | | |
|---|---|---|---|
| 5,237,648 | 8/1993 | Mills et al. | 345/328 |
| 5,729,471 | 3/1998 | Jain et al. | 345/327 |
| 5,745,710 | 4/1998 | Clanton, III et al. | 345/327 |

FOREIGN PATENT DOCUMENTS

| | | | |
|---|---|---|---|
| 0 555 028 | 8/1993 | European Pat. Off. | G06F 15/72 |
| 0 590 759 | 4/1994 | European Pat. Off. | G11B 27/031 |

OTHER PUBLICATIONS

Mills et al., "A Magnifier Tool for Video Data", ACM CHI '92, pp. 93–98, May 7, 1992.

Tonomura et al., "Content Oriented Visual Interface using Video Icons for Visual Database Systems", IEEE, pp. 68–73, Oct. 6, 1989.

Akutsu, A. et al., "Video Indexing Using Motion Vectors," *Proceedings of the SPIE*, vol. 1818, No. Part 3, Nov. 18, 1992, pp. 1522–1530.

Hirotada, Ueda et al., "Automatic Structure Visualization for Video Editing," *Bridges Between Worlds*, Amsterdam, Apr. 24–29, 1993; pp. 137–141.

Huang, J., et al., "Image Indexing Using Color Correlograms," *IEEE Computer Vision and Pattern Recognition Conference*, San Juan, Puerto Rico, Jun. 17–19, 1997, pp. 762–768.

Kataoka, R., et al. "Architecture and Storage Structure of an Interactive Multimedia Information System," *IEICE Transactions on Information and Systems*, vol. E78–D, No. 11, Nov. 1, 1995, pp. 1354–1365.

(List continued on next page.)

*Primary Examiner*—John E. Breene
*Attorney, Agent, or Firm*—James L. Ewing, IV, Esq.; Geoff L. Sutcliffe, Esq.; Kilpatrick Stockton LLP

[57] ABSTRACT

Interactive interfaces to video information provide a displayed view of a quasi-object called a root image. The root image consists of a plurality of basic frames selected from the video information, arranged such that their respective x and y directions are aligned with the x and y directions in the root image and the z direction in the root image corresponds to time, such that base frames are spaced apart in the z direction of the root image in accordance with their time separation. The displayed view of the root image changes in accordance with a designated viewing position, as if the root image were a three-dimensional object. The user can manipulate the displayed image by designating different viewing positions, selecting portions of the video information for playback and by special effects, such as cutting open the quasi-object for a better view. A toolkit permits interface designers to design such interfaces, notably so as to control the types of interaction which will be possible between the interface and an end user. Implementations of the interfaces may include editors and viewers.

41 Claims, 14 Drawing Sheets

OTHER PUBLICATIONS

Kobla, V., et al. "Archiving, Indexing, and Retrieval of Video in the Compressed Domain," *SPIE Conference on Multimedia Storage and Archiving Systems*, Boston, Massachusetts Nov. 18–19, 1996, vol. 2916, pp. 78–89.

Madrane, N., et al., "Video Representation Tools Using a Unified Object and Perspective Base Approach," *Proceedings of the SPIE*, vol. 2420, Feb. 9, 1995, pp. 152–163.

Madrane, N., et al., "Video Representation Tools Using a Unified Object and Perspective Base Approach," *Proceedings of the SPIE*, vol. 2420, 1995, pp. 160, 162.

Massey, M. et al. "Salient Stills: Process and Practice," *IBM Systems Journal*, vol. 35, No. 3/04, 1996, pp. 557–573.

Meng, J. and S. Chang, "CVEPS—A Compressed Video Editing and Parsing System," *Proceedings of ACM Multimedia 1996*, Boston, Massachusetts, Nov. 18–22, 1996, pp. 43–53.

Pass, G., et al. "Comparing Images Using Color Coherence Vectors," *Proceedings of ACM Multimedia 1996*, Boston, Massachusetts, Nov. 18–22, 1996, pp. 65–73.

Taniguchi, Y., et al., "Panorama Excerpts: Extracting and Packing Panoramas for Video Browsing," *Proceedings of the ACM Multimedia*, Seattle, Washington, Nov. 9–13, 1997, pp. 427–436.

Tonomura, Y., et al. "Content Oriented Visual Interface Using Video Icons for Visual Database Systems," *Journal of Visual Languages and Computing*, vol. 1, Jan. 1, 1990, pp. 183–198.

Yeung, M. et al. "Video Browsing Using Clustering and Scene Transitions on Compressed Sequences," *Proceedings, IS&T/SPIE Multimedia Computing and Networking*, pp. 399–413 (1995).

"Advanced Imaging Product Survey: Photo, Document and Video," *Advanced Imaging*, Oct. 1994, pp. 66–72.

Ariki et al., "Extraction of News Articles based on Scene Cut Detection using DCT Clustering," International Conference on Image Processing, Sep. 1996, Lausanne, Switzerland, pp. 847–850.

Hampapur et al., "Digital Video Segmentation," ACM Multimedia '94 Proceedings, ACM Press–1, Oct. 1994, pp. 357–364.

Hoetter, M., "Differential Estimation of the Global Motion Parameters Zoom and Pan," Signal Processing, vol. 16, pp. 249–265, 1989.

Huang, T.S., "Modeling Analysis and Visualization of Non-rigid Object Motion," International Conf. on Pattern Recognition, vol. 1, pp. 361–364, Atlantic City, NJ Jun. 1990.

Mazest, et al. "Video Representation Tools Using a Unified Object and Perspective Base Approach," IS&T/SPIE Conference on Storage and Perusal for Image Video Databases, San Jose, California, Feb. 1995.

Shio et al., "Segmentation of People in Motion," Proc. IEEE, vol. 79, pp. 325–332, 1991.

Teodosio et al., "Salient Video Stills: Content and Context Preserved," Proc. ACM Multimedia 93, California, Aug. 1–6, 1993, pp. 39–47.

Tse et al, "Global Zoom/Pan Estimation and Compensation for Video Compression," Proc. ICASSP, vol. 4, pp. 2725–2728, May 1991.

Zhang et al, "Developing Power Tools for Video Indexinor and Retrieval," SPIE, vol. 2185, pp. 140–149.

Zhang, HoncJiang et al., "Automatic Partitioning of Full-Motion Video," Multimedia Systems (Springer–Verfaa, 1991) 1, pp. 10–28.

RELATIVE PLACEMENT OF DISPLAYED FRAMES FOLLOW MOTION IN IMAGE REPRESENTED BY THE SEQUENCE

| HEADER |
|---|
| I.D. OF ASSOCIATED VIDEO SEQUENCES |
| DEFINITION OF BASIC FRAMES OF ROOT IMAGE<br>FRAME NO. 5<br>FRAME NO. 18<br>FRAME NO. 30<br>FRAME NO. 52<br>.<br>.<br>.<br>FRAME NO. 481 |
| IDENTITIES OF EXTRACTABLE OBJECTS |
| LOCATION OF EXTRACTABLE OBJECTS |
| FRAME NO.   X   Y   OBJECTS<br>05   2-75   9-19   1<br>18   4-77   180-190   1<br>.   .   .<br>05   211-300   10-20   2<br>18   196-275   30-40   2<br>.   .   . |
| RULES GOVERNING DISPLAY OF ADDITIONAL FRAMES AS VIEWING POSITION CHANGES |
| IDENTITIES OF FRAME POSITIONS WHERE "ACCORDION EFFECT" IS PERMITTED |
| VIDEO SEQUENCE CHARACTERISTICS e.g. CUTS, CAMERA, ANGLES, CAMERA, MOTION, ETC. |
| I.D. OF ASSOCIATED SCRIPT |
| |
| END |

HEADER — IDENTIFIES FDI AS INTERFACE DATA FILE; IDENTIFIES VERSION NO. (APPLICATIO PROGRAM REQUIRED); IDENTIFIES LENGTH OF FDI; ETC.

FIG. 3

IF APPROPRIATE:

- NO. OF SUB-SEQUENCES & LOCATION IN MAIN SEQUENCES
- DEFINITION OF SECONDARY ROOT IMAGE
  - SUB-SEQUENCE 1
  - SUB-SEQUENCE 2
  - SUB-SEQUENCE 3
  - :
- END OF SUB-SEQUENCE INFORMATION

INTERACTIVE VIDEO ICON WITH DESIGNATED VIEWING POSITION The present invention relates to the field of interfaces for video information. More particularly, the present invention provides interactive interfaces for video information and toolkits for use in creation of such interactive interfaces.

BACKGROUND AND SUMMARY

Video information is being produced at an ever-increasing rate and video sequences, especially short sequences, are increasingly being used, for example, in websites and on CD-ROM, and being created, for example, by domestic use of camcorders. There is a growing need for tools enabling the indexing, handling and interaction with video data. It is particularly necessary for interfaces to be provided which enable a user to access video information selectively and to interact with that information, especially in a non-sequential way.

Conventionally, video information consists of a sequence of frames recorded at a fixed time interval. In the case of classic television signals, for example, the video information consists of 25 or 30 frames per second. Each frame is meaningful since it corresponds to an image which can be viewed. A frame may be made up of a number of interlaced fields, but this is not obligatory as is seen from more recently proposed video formats, such as those intended for high definition television. Frames describe the temporal decomposition of the video image information. Each frame contains image information structured in terms of lines and pixels, which represent the spatial decomposition of the video.

In the present document, the terms "video information" or "video sequences" refer to data representing a visual image recorded over a given time period, without reference to the length of that time period or the structure of the recorded information. Thus, the term "video sequence" will be used to refer to any series of video frames, regardless of whether this series corresponds to a single camera shot (recorded between two cuts) or to a plurality of shots or scenes.

Traditionally, if a user desired to know what was the content of a particular video sequence he was obliged to watch as each frame, or a sub-sample of the frames, of the sequence was displayed successively in time. (For purposes of this document, the terms "he," "him," or "his" are used for convenience in place of she/he, her/him and hers/his, and are intended to be gender-neutral.) This approach is still widespread, and in applications where video data is accessed using a personal computer, the interface to the video often consists of a displayed window in which the video sequence is contained and a set of displayed controls similar to those found on a video tape recorder (allowing fastforward, rewind, etc.).

Developments in the fields of video indexing and video editing have provided other forms of interface to video information.

In the field of video indexing, it is necessary to code information contained in a video sequence in order to enable subsequent retrieval of the sequence from a database by reference to keywords or concepts. The coded content may, for example, identify the types of objects present in the video sequence, their properties/motion, the type of camera movements involved in the video sequence (pan, tracking shot, zoom, etc.), and other properties. A "summary" of the coded document may be prepared, consisting of certain representative frames taken from the sequence, together with text information or icons indicating how the sequence has been coded. The interface for interacting with the video database typically includes a computer input device enabling the user to specify objects or properties of interest and, in response to the query, the computer determines which video sequences in the database correspond to the input search terms and displays the appropriate "summaries". The user then indicates whether or not a particular video sequence should be reproduced. Examples of products using this approach are described in the article "Advanced Imaging Product Survey: Photo, Document and Video" from the journal "Advanced Imaging", October 1994, which document is incorporated herein by this reference.

In some video indexing schemes, the video sequence is divided up into shorter series of frames based upon the scene changes or the semantic content of the video information. A hierarchical structure may be defined. Index "summaries" may be produced for the different series of frames corresponding to nodes in the hierarchical structure. In such a case, at the time when a search is made, the "summary" corresponding to a complete video sequence may be retrieved for display to the user who is then allowed to request display of "summaries" relating to sub-sections of the video sequence which are lower down in the hierarchical structure. If the user so wishes, a selected sequence or sub-section is reproduced on the display monitor. Such a scheme is described in EP-A-0 555 028 which is incorporated herein by this reference.

A disadvantage of such traditional, indexing/searching interfaces to video sequences is that the dynamic quality of the video information is lost.

Another approach, derived from the field of video editing, consists of the "digital storyboard". The video sequence is segmented into scenes and one or more representative frames from each scene is selected and displayed, usually accompanied by text information, side-by-side with representative frames from other segments. The user now has both a visual overview of all the scenes and a direct visual access to individual scenes. Each representative frame of the storyboard can be considered to be an icon. Selection of the icon via a pointing device (typically a mouse-controlled cursor) causes the associated video sequence or sub-sequence to be reproduced. Typical layouts for the storyboards are two-dimensional arrays or long one-dimensional strips. In the first case, the user scans the icons from the left to the right, line by line, whereas in the second case the user needs to move the strip across the screen.

Digital storyboards are typically created by a video editor who views the video sequence, segments the data into individual scenes and places each scene, with a descriptive comment, onto the storyboard. As is well-known from technical literature, many steps of this process can be automated. For example, different techniques for automatic detection of scene changes are discussed in the following documents, each of which is incorporated herein by reference:

"A Real-time neural approach to scene cut detection" by Ardizzone et al, IS&T/SPIE—Storage & Retrieval for Image and Video Databases IV, San Jose, Calif.

"Digital Video Segmentation" by Hampapur et al, ACM Multimedia '94 Proceedings, ACM Press -1

"Extraction of News Articles based on Scene Cut Detection using DCT Clustering" by Ariki et al, International Conference on Image Processing, September 1996, Lausanne, Switzerland;

"Automatic partitioning of full-motion video" by Hon-cJiang Zhang et al, Multimedia Systems (Springer-Verfaa, 199')), 1, pages 10–28-, and

EP-A-0 590 759.

Various methods for automatically detecting and tracking persons and objects in video sequences are considered in the following documents, each of which is incorporated herein by reference:

"Modeling, Analysis and Visualization of Nonrigid Object Motion", by T. S. Huang, Proc. of International Conf. on Pattern Recognition, Vol. 1, pp 361–364, Atlantic City, N.J., June 1990- and "Segmentation of People in Motion" by Shio et al, Proc. IEEE, vol. 79, pp 325332, 1991.Techniques for automatically detecting different types of camera shot are described in "Global zoom/pan estimation and compensation for video compression" by Tse et al, Proc. ICASSP, Vol.4, pp 2725–2728, May 1991; and "Differential estimation of the global motion parameters zoom and pan" by M. Hoetter, Signal Processing, Vol. 16, pp 249–265, 1989.

In the case of digital storyboards too, the dynamic quality of the video sequence is often lost or obscured. Some impression of the movement inherent in the video sequence can be preserved by selecting several frames to represent each scene, preferably frames which demonstrate the movement occurring in that scene. However, storyboardtype interfaces to video information remain awkward to use in view of the fact that multiple actions on the user's part are necessary in order to view and access data.

Attempts have been made to create a single visual image which represents both the content of individual views making up a video sequence and preserves the context, that is, the time-varying nature of the video image information.

One such approach creates a "trace" consisting of a single frame having superimposed images taken from different frames of the video sequence, these images being offset one from the other due to motion occurring between the different frames from which the images were taken. Thus, for example, in the case of a video sequence representing a sprinter running, the corresponding "trace" will include multiple (probably overlapping) images of the sprinter, spaced in the direction in which the sprinter is running. Another approach of this kind generates a composite image, called a "salient still", representative of the video sequence—see "Salient Video Stills: Content and Context Preserved" by Teodosio et al, Proc. ACM Multimedia 93, California, Aug. 1–6, 1993), pp 39–47 which article is incorporated herein by this reference in its entirety.

Still another approach of this general type consists in creation of a "video icon", as described in the papers "Developing Power Tools for Video Indexinor and retrieval" by Zhang et al, SPIE, Vol.2185, pp 140–149-, and "Video Representation tools using a unified object and perspective based approach" by the present inventors, IS&T/SPIE Conference on Storage and Perusal for Image and Video Databases, San Jose, Calif., February 1995 which are incorporated herein by reference.

In a "video icon", as illustrated in FIG. 1A, the scene is represented by a number of frames selected from the sequence and which are displayed as if they were stacked up one behind the other in the z-direction and are viewed in perspective. In other words, each individual frame is represented by a plane and the planes lie one behind the other with a slight offset. Typically the first frame of the stack is displayed in its entirety whereas underlying frames are partially occluded by the frames in front. The envelope of the stack of frames has a parallelepiped shape. The use of a number of frames, even if they are partially occluded, gives the user a more complete view of the scene and, thus, a better visual understanding. Furthermore, with some such icons, the user can directly access any frame represented in the icon.

Two special types of video icon have been proposed, "object based" video icons and video icons containing a representation of camera movement. In an "object based" video icon, as illustrated in FIG. 1B, objects of interest are isolated in the individual frames and, for at least some of the stacked frames, the only image information included in the video icon is the image information corresponding to the selected object. In such a video icon, at least some of the individual frames are represented as if they were transparent except in the regions containing the selected object. Video icons containing an indication of camera movement may have, as illustrated in the example of FIG. 1C, a serpentine-shaped envelope corresponding to the case of side-to-side motion of the camera.

The video icons discussed above present the user with information concerning the content of the whole of a video sequence and serve as a selection tool allowing the user to access -frames of the video sequence out of the usual order. In other words, these icons allow non-sequential access to the video sequence. Nevertheless, the ways in which the user can interact with the video sequence information are strictly limited. The user can select frames for playback in a non-sequential way but he has little or no means of obtaining a deeper level of information concerning the video sequence as a whole, short of watching a playback of the whole sequence.

The present invention provides a novel type of interface to video information which allows the user to access information concerning a video sequence in a highly versatile manner. In particular, interactive video interfaces of the present invention enable a user to obtain deeper levels of information concerning an associated video sequence at positions in the sequence which are designated by the user as being of interest.

The present invention provides an interface to information concerning an associated video sequence, one such interface comprising:

information defining a three-dimensional root image, the root image consisting of a plurality of basic frames selected from said video sequence, and/or a plurality of portions of video frames corresponding to selected objects represented in the video sequence, x and y directions in the root image corresponding to x and y directions in the video frames and the z direction in the root image corresponding to the time axis whereby the basic frames are spaced apart from one another in the z direction of the root image by distances corresponding to the time separation between the respective video frames;

means for displaying views of the root image;

means for designating a viewing position relative to said root image; and means for calculating image data representing said three-dimensional root image viewed from the designated viewing position, and for outputting said calculated image data to the displaying means.

According to the present invention, customized user interfaces may be created for video sequences. These interfaces comprise a displayable "root" image which directly represents the content and context of the image information in the video sequence and can be manipulated, either automatically or by the user, in order to display further image information, by designation of a viewing position with respect to the root image, the representation of the displayed image being changed in response to changes in the designated viewing position. In a preferred embodiment of the present invention, the representation of the displayed image changes dependent upon the designated viewing position as if the root image were a three-dimensional object. In such preferred embodiments, as the designated viewing position changes, the data necessary to form the displayed representation of the root image is calculated so as to provide the correct perspective view given the viewing angle, the distance separating the viewing position from the displayed quasi-object and whether the viewing position is above or below the displayed quasi-object.

In a reduced form, the present invention can provide non-interactive interfaces to video sequences, in which the root image information is packaged with an associated script defining a routine for automatically displaying a sequence of different views of the root image and performing a set of manipulations on the displayed image, no user manipulation being permitted. However, the full benefits of the invention are best seen in interactive interfaces where the viewing position of the root image is designated by the user, as follows. When the user first accesses the interface he is presented with a displayed image which represents the root image seen from a particular viewpoint (which may be a predetermined reference viewpoint). As he designates different viewing angles, the displayed image represents the root image seen from different perspectives. When the user designates viewing positions at greater or lesser distances from the root image, the displayed image increases or reduces the size and, preferably, resolution of the displayed information, accessing image data from additional video frames, if need be.

The customized, interactive interfaces provided by the present invention involve displayed images, representing the respective associated video sequences, which, in some ways, could be considered to be a navigable environment or a manipulable object. This environment or object is a quasi-three-dimensional entity. The x and y dimensions of the environment/object correspond to true spatial dimensions (corresponding to the x and y directions in the associated video frames) whereas the z dimension of the environment/object corresponds to the time axis. These interfaces could be considered to constitute a development of the "video icons" discussed above, now rendered interactive and manipulable by the user.

With the interfaces provided by the present invention, the user can select spatial and temporal information from a video sequence for access by designating a viewing position with respect to a video icon representing the video sequence. Arbitrarily chosen oblique "viewing directions" are possible whereby the user simultaneously accesses image information corresponding to portions of a number of different frames in the video sequence. As the user's viewing position relative to the video icon changes, the amount of a given frame which is visible to him, and the number and selection of frames which he can see, changes correspondingly.

As mentioned above, the interactive video interfaces of the present invention make use of a "root" image comprising a plurality of basic frames arranged to form a quasi-three dimensional object. It is preferred that the relative placement positions of the basic frames be arranged so as to indicate visually some underlying motion in the video sequence. Thus, for example, if the video sequence corresponds to a travelling shot moving down a hallway and turning a corner, the envelope of the set of basic frames preferably does not have a parallelepiped shape but, instead, composes a "pipe" of rectangular section and bending, in a way corresponding to the camera travel during filming of the video sequence.

In preferred embodiments of video interfaces according to the present invention, the basic video frames making up the root image are chosen as a function of the amount of motion or change in the sequence. For example, in the case of a video sequence corresponding to a travelling shot, in which the background information changes, it is preferable that successive basic frames should include back-round information overlapping by, say, 50%.

In certain embodiments of the present invention, the root image corresponds to an "object-based video icon." In other words, certain of the basic frames included in the root image are not included therein in full; only those portions corresponding to selected objects are included. Alternatively, or additionally, certain basic frames may be included in full in the root image but may include "hot objects," that is, representations of objects selectable by the user. In response to selection of such "hot objects" by the user, the corresponding basic frames (and, if necessary, additional frames) are then displayed as if they had become transparent at all portions thereof except the portion(s) where the selected object or objects are displayed. The presence of such selectable objects in the root image allows the user to selectively isolate objects of interest in the video sequence and obtain at a glance a visual impression of the appearance and movement of the objects during the video sequence.

The interfaces of the present invention allow the user to select an arbitrary portion of the video sequence for playback. The user designates a portion of the video sequence which is of interest, by designating a corresponding portion of the displayed image forming part of the interface to the video sequence. This portion of the video sequence is than played back. The interface may include a displayed set of controls similar to those provided on a VCR in order to permit the user to select different modes for this playback, such as fast-forward, rewind, etc.

In preferred embodiments of interfaces according to the invention, the displayed image forming part of the interface remains visible whilst the designated portion of the sequence is being played back. This can be achieved in any number of ways, as for example, by providing a second display device upon which the playback takes place, or by designating a "playback window" on the display screen, this playback window being offset with respect to the screen area used by the interface, or by any other suitable means.

The preferred embodiments of interfaces according to the invention also permit the user to designate an object of interest and to select a playback mode in which only image information concerning that selected object is included in the playback. Furthermore, the user can select a single frame from the video sequence for display separately from the interactive displayed image generated by the interface.

In preferred embodiments, the interfaces of the present invention allow the user to generate a displayed image corresponding to a distortion of the root image. More especially, the displayed image can correspond to the root image subjected to an "accordion effect", where the root image is "cracked open", for example, by bending around a bend line so as to "fan out" video frames in the vicinity of the opening point, or is modified by linearly spreading apart video frames at a point of interest. The accordion effect can also be applied repetitively or otherwise in a nested fashion according to the present invention.

The present invention can provide user interfaces to "multi-threaded" video sequences, that is, video sequences consisting of numerous interrelated shorter segments such as are found, for example, in a video game where the user's choices change the scene which is displayed. Interfaces to such multi-threaded video sequences can include frames of the different video segments in the root image, such that the root image has a branching structure. Alternatively, some or all of the different threads may not be visible in the root image but may become visible as a result of user manipulation. For example, if the user expresses an interest in a particular region of the video sequence by designating a portion of a displayed root image using a pointing device (such as a mouse, or by touching a touch screen, etc.) then if multiple different threads of the sequence start from the designated area, image portions for these different threads may be added to the displayed image.

In preferred embodiments of interfaces according to the present invention, the root image for the video sequence concerned is associated with information defining how the corresponding displayed image will change in response to given types of user manipulation. Thus, for example, this associated information may define how many, or which additional frames are displayed when the user moves the viewing position closer up to the root image. Similarly, the associated information may identify which objects in the scene are "hot objects" and what image information will be displayed in relation to these hot objects when activated by the user.

Furthermore, different possibilities exist for delivering the components of the interface to the end user. In an application where video sequences are transmitted to a user over a telecommunications path, such as via the Internet, the user who is interested in a particular video sequence may first download only certain components of the associated interface. First of all he downloads information for generating a displayed view of the root image, together with an associated application program (if he does not already have an appropriate "interface player" loaded in his computer). The downloaded (or already-resident) application program includes basic routines for chancing the perspective of the displayed image in response to changes in the viewing position designated by the user. The application program is also adapted to consult any "associated information" (as mentioned above) which forms part of the interface and conditions the way in which the displayed image changes in response to certain predetermined user manipulations (such as "zoom-in" and "activate object"). If the interface does not contain any such "associated information" then the application program makes use of pre-set default parameters.

The root image corresponds to a particular set of basic video frames and information designating relative placement positions thereof. The root image information downloaded to the user may include just the data necessary to create a reference view of the root image or it may include the image data for the set of basic frames (in order to enable the changes in user viewing angle to be catered for without the need to download additional information). In a case where the user performs a manipulation which requires display of video information which is not present in the root image (e.g. he "zooms in" such that data from additional frames is required), this extra information can either be pre-packaged and supplied with the root image information or the extra information can be downloaded from the host website as and when it is needed.

Similar possibilities exist in the case of interfaces provided on CD-ROM. In general, the root image and other associated information will be provided on the CD-ROM in addition to the full video sequence. However, it is to be understood that, for reasons of space saving, catalogues of video sequences could be made consisting solely of interfaces, without the corresponding full video sequences.

In addition to providing the interfaces themselves, the present invention also provides apparatus for creation of interfaces according to the present invention. This may be dedicated hardware or, more preferably, a computer system programmed in accordance with specially designed computer programs.

Various of the steps involved in creation of a customized interface according to the present invention can be automated. Thus, for example, the selection of basic frames for inclusion in the "root image" of the interface can be made automatically according to one of a number of different algorithms, such as choosinbg one frame every n frames, or choosing 1 frame every time the camera movement has displaced the background by m%, etc. Similarly, the relative placement positions of the basic frames in the root image can be set automatically taking into account the time separation between those frames and, if desired, other factors such as camera motion. Similarly, the presence of objects or people in the video sequence can be detected automatically according to one of the known algorithms (such as those discussed in the references cited above), and an "object oriented" root image can be created automatically. Thus, in some embodiments, the interface creation apparatus of the present invention has the capability of automatically processing video sequence information in order to produce a root image. These embodiments include means for associating with the root image a standard set of routines for changing the representation of the displayed image in response to user manipulations.

However, it is often preferable actively to design the characteristics of interactive interfaces according to the invention, such that the ways in which the end user can interact with the video information are limited or channeled in preferred directions, This is particularly true in the case of video sequences which are advertisements or are used in educational software and the like.

Thus, the present invention provides a toolkit for use in creation of customized interfaces. In preferred embodiments, the toolkit enables a designer to tailor the configuration and content of the root image, as well as to specify which objects in the video sequence are "hot objects" and to control the way in which the displayed interface image will change in response to manipulation by an end user. Thus, among other things, the toolkit enables the interface designer to determine which frames of the video sequence should be used as basic frames in the root image, and how many additional frames are added to the displayed image when the user designates a viewing position close to the root image.

BRIEF DESCRIPTION OF THE DRAWINGS

Further features and advantages of the present invention will become apparent from the following description of preferred embodiments thereof, given by way of example, and illustrated by the accompanying drawings, in which:

FIGS. 1A–C illustrates various types of video icon, wherein FIG. 1A shows an ordinary video icon, FIG. 1B shows an object-based video icon and FIG. 1C shows a video icon including a representation of camera motion;

FIG. 3 is a diagram illustrating the content of the interface data file (FDI) used in the first embodiment of the invention;

FIGS. 5A–C illustrate the displayed image in the case of the root image viewed from the different viewing positions of FIG. 4, wherein FIG. 5A represents the displayed image from viewing position A, wherein FIG. 5B represents the displayed image from viewing position B, and wherein FIG. 5C represents the displayed image from viewing position C;

FIGS. 6A–B illustrate displayed images based on more complex root images according to the present invention, in which FIG. 6A is derived from a root image visually representing motion and FIG. 6B is derived from a root image visually representing a zoom effect;

DETAILED DESCRIPTION

The components of an interactive interface according to a first preferred embodiment of the present invention will now be described with reference to FIG. 2. In this example, an interactive interface of the invention is associated with video sequences recorded on a CD-ROM.

Figure 2:
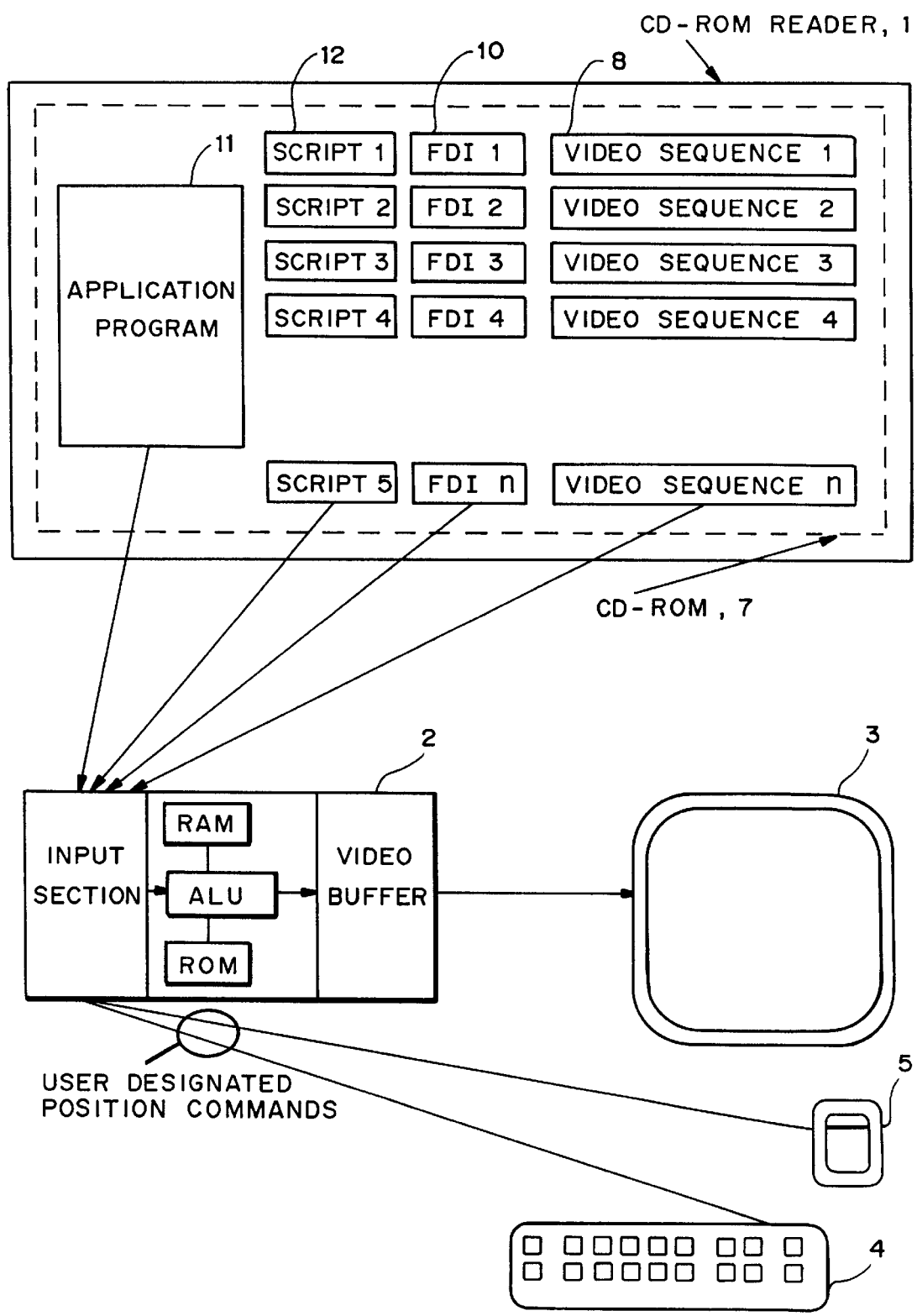
FIG. 2 is a block diagram indicating the components of an interactive interface according to a first embodiment of the present invention.

As shown in FIG. 2, a CD-ROM reader 1 is connected to a computer system including a central processor portion 2, a display screen 3, and a user-operable input device which, in this case, includes a keyboard 4 and a mouse 5. When the user wishes to consult video sequences recorded on a CD-ROM 7, he places the CD-ROM 7 in the CD-ROM reader and activates CD-ROM accessing software provided in the central processor portion 2 or an associated memory or unit.

According to the first embodiment of the invention, the CD-ROM has recorded thereon not only the video sequence image information 8 (in any convenient format), but also a respective interface data file (FDI$_i$) 10 for each video sequence, together with a video interface application program 11. The content of a typical data file is illustrated in FIG. 3. Respective scripts 12 are optionally associated with the interface data files. When data on the CD-ROM is to be read, the video interface application program 11 is operated by the central processor portion 2 of the computer system and the interface data file applicable to the video sequence selected by the user is processed in order to cause an interactive video icon (see, for example, FIGS. 4 and 5) to be displayed on the display screen 3. The user can then manipulate the displayed icon, by making use of the mouse or keyboard input devices, in order to explore the selected video sequence.

The types of manipulations of the interactive video icon which are available to the user will now be described with reference to FIGS. 4 to 9.

Figure 4:
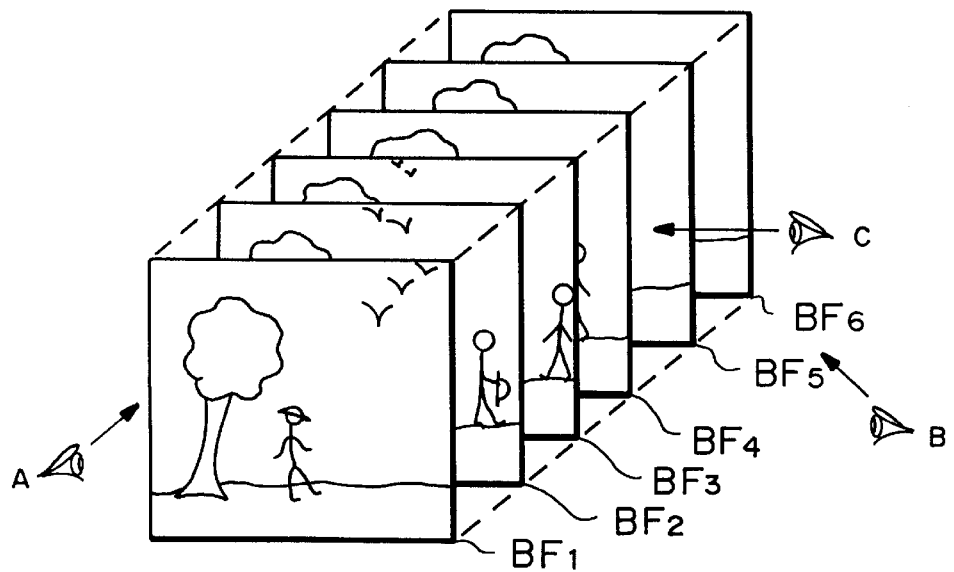
FIG. 4 is a diagram illustrating a reference view of a root image and three viewing, positions designated by a user.

FIG. 4 illustrates a simple interactive video icon according to the present invention. In particular, this video icon is represented on the display screen as a set of superposed images arranged within an envelope having the shape of a regular parallelepiped. Each of the superposed images corresponds to a video frame selected from the video sequence, but these frames are offset from one another. It may be considered that the displayed image corresponds to a cuboid viewed from a particular viewing position (above and to the right, in this example). This cuboid is a theoretical construct consisting of the set of selected video frames disposed such that their respective x and y axes correspond to the x and y axes of the cuboid and the z axis of the cuboid corresponds to the time axis. Thus, in the theoretical construct cuboid, the selected frames are spaced apart in the z direction in accordance with their respective time separations in the video sequence.

Figure 5A:
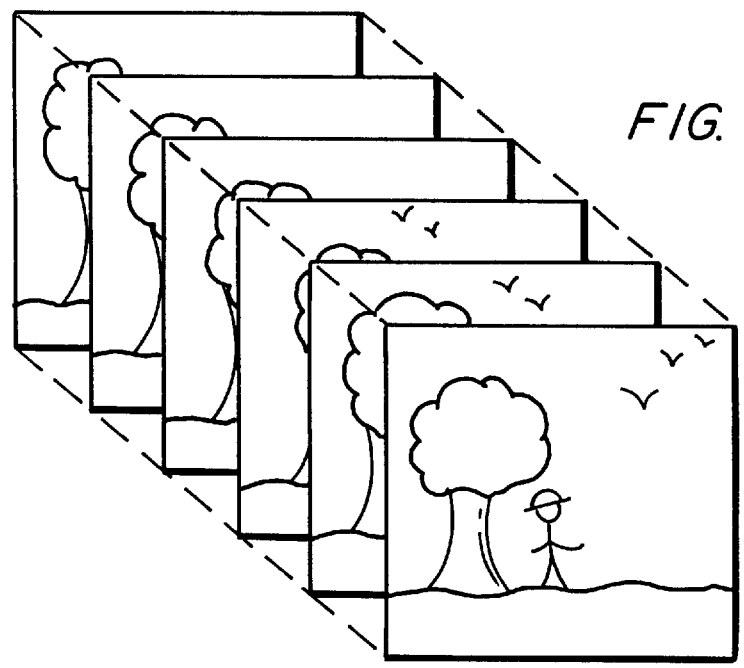
Figure 5B:
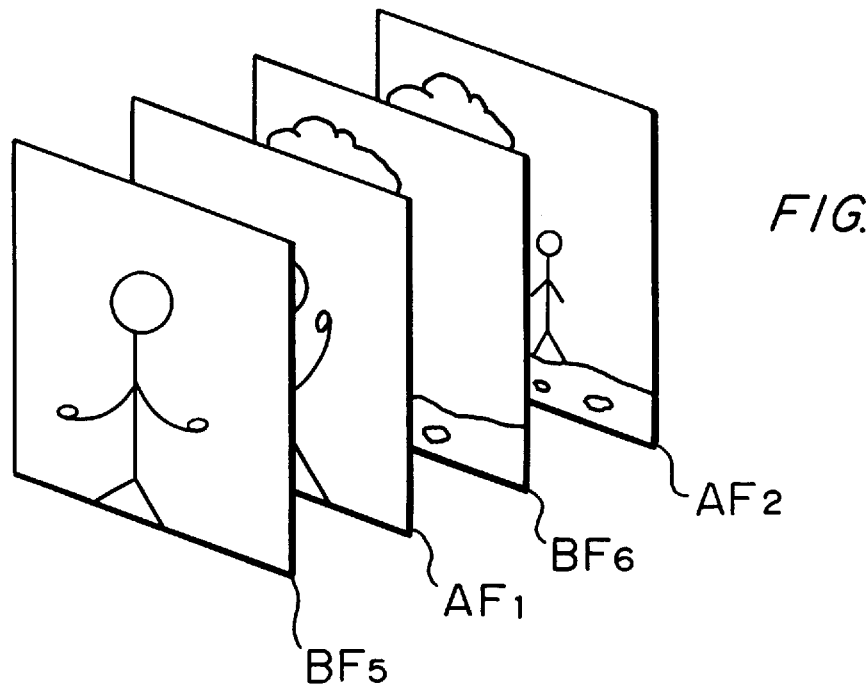
Figure 5C:
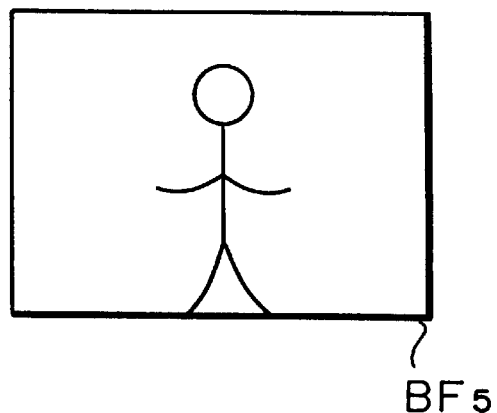

When the user seeks to explore the video sequence via the interactive video icon displayed on the display screen, one of the basic operations he can perform is to designate a position on the screen as a viewing position relative to the displayed image (e.g. by "clicking" with the computer mouse). In FIG. 4, three such designated viewing positions are indicated by the letters A, B and C. In response to this operation by the user, the displayed image is changed to the form shown in FIG. 5: FIGS. 5A, 5B and 5C correspond to "viewing positions" A, B and C, respectively, of FIG. 4. The image displayed to the user changes so as to provide a perspective view of the theoretical cuboid as seen from an angle corresponding to the viewing position designated by the user.

The above-mentioned cuboid is a special case of a "root image" according to the present invention. This "root image" is derived from the video sequence and conveys information concerning both the image content of the selected sub-set of frames (called below, "basic frames") and the relative "position" of that image information in time as well as space. It is to be appreciated that the "root image" is defined by information in the interface data file. The definition specifies which video frames are "basic frames" (for example, by storing the relevant frame numbers), as well as specifying the placement positions of the basic frames relative to one another within the root image.

The central processor portion 2 of the computer system calculates the image data required to generate the displayed image from the root image definition contained in the appropriate interface data file, image data of the basic frames (and, where required, additional frames) and the viewing position designated by the user, using, standard ray-tracing techniques. The data required to generated the displayed image is loaded into the video buffer and displayed on the display screen.

According to the present invention it is preferred that, when the user designates a viewing position close up to the interactive video icon, the image information in the area of interest should be enriched. This is achieved by including, in the displayed image, image data relating to additional video frames besides the basic video frames. Such a case is illustrated in FIG. 5B, where the basic frames BF5 and BF6 are displayed together with additional frames AF1 and AF2. As the user-designated viewing position approaches closer and closer to the displayed image the video interface application program causes closely spaced additional frames to be added to the displayed image. Ultimately, successive video frames of the video sequence may be included in the displayed image. As is clear from FIG. 5B, image information corresponding to parts of the root image distant from the area of interest may be omitted from the displayed "close-up" image.

Preferably, the interface data file includes data specifying how the choice should be made of additional frames to be added as the user "moves close up" to the displayed image. More preferably, this data defines rules governing the choice of how many, and which, additional frames should be used to enrich the displayed image as the designated viewing position changes. These rules can, for example, define a mathematical relationship between the number of displayed frames and the distance separating the designated viewing position and the displayed quasi-object. In preferred embodiments of the invention, the number of frames which are added to the display as the viewing position approaches the displayed quasi-object depends upon the amount of motion or change in the video sequence at that location.

The example illustrated in FIG. 4 is a simplification in which the displayed image corresponds to a root image having a simple, cuboid shape. However, according to the present invention, the root image may have a variety of different forms.

Figure 6A:
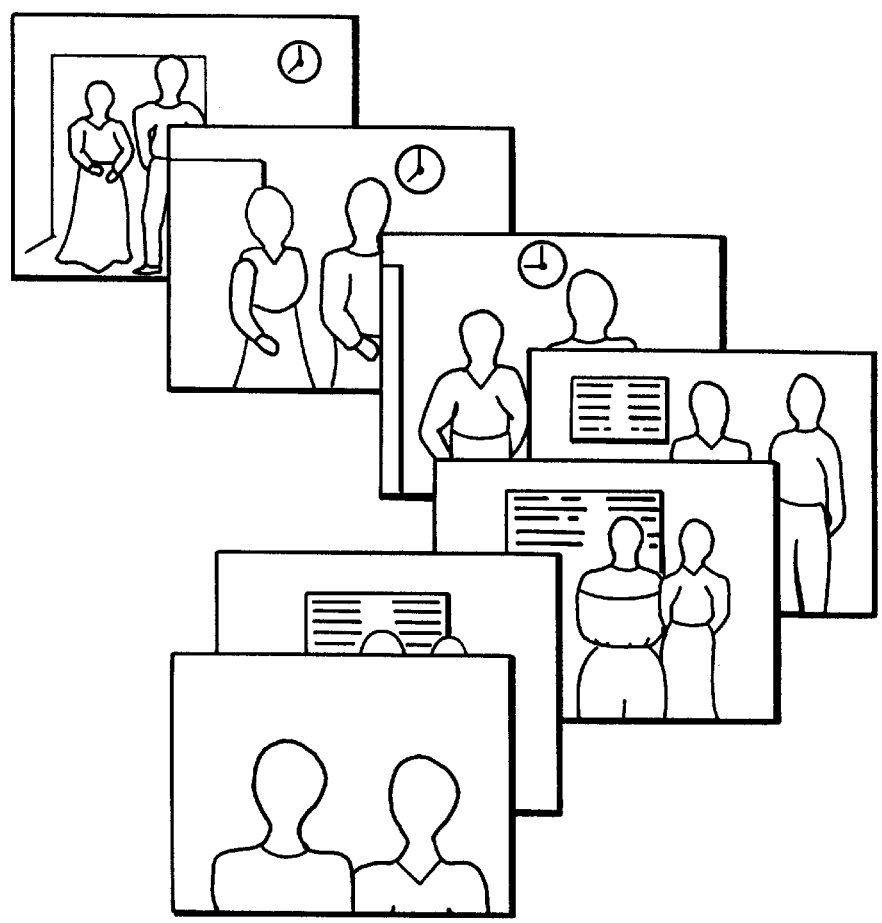

For example, the relative placement positions of the basic frames may be selected such that the envelope of the root image has a shape which reflects motion in the corresponding video sequence (either camera motion, during tracking shots and the like, or motion of objects represented in the sequence)—see the corresponding interactive icon shown in FIG. 6A. Similarly, the dimensions of the basic frames in the root image may be scaled so as to visually represent a zoom effect occurring in the video sequence -see the corresponding interactive icon shown in FIG. 6B.

Figure 6B:
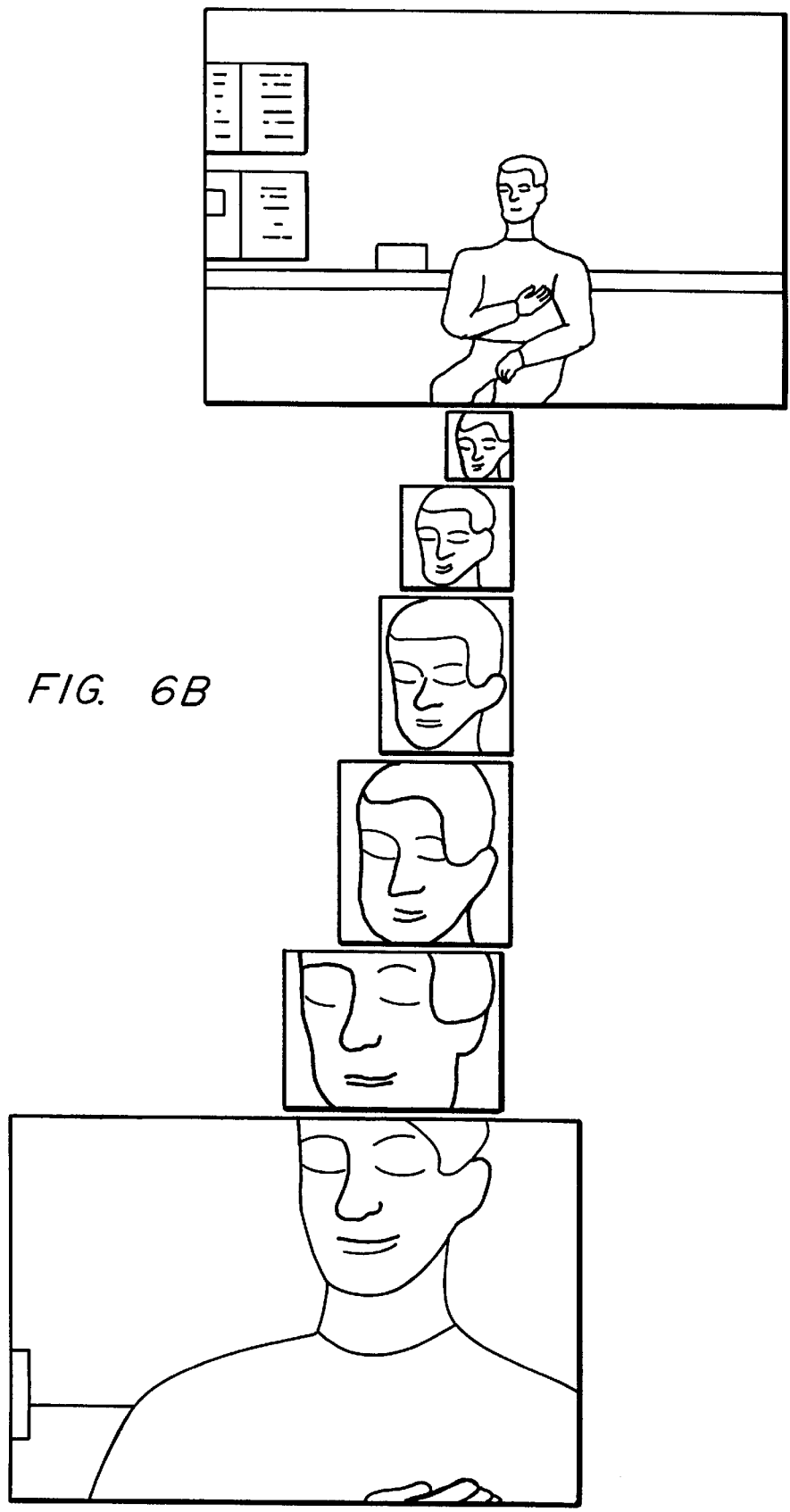

It will be seen that the interactive icon represented in FIG. 6B includes certain frames for which only a portion of the image information has been displayed. This corresponds to a case where an object of special interest has been selected. Such object selection can be made in various ways. If desired, the root image may be designed such that, instead of including basic frames in full, only those portions of frames which represent a particular object are included. This involves a choice being made, at the time of design of the root image portion of the interface, concerning which objects are interesting. The designer can alternatively or additionally decide that the root image will include basic frames in full but that certain objects represented in the video sequence are to be "selectable" or "extractable" at user request. This feature will now be discussed with reference to FIG. 7.

Figure 7A:
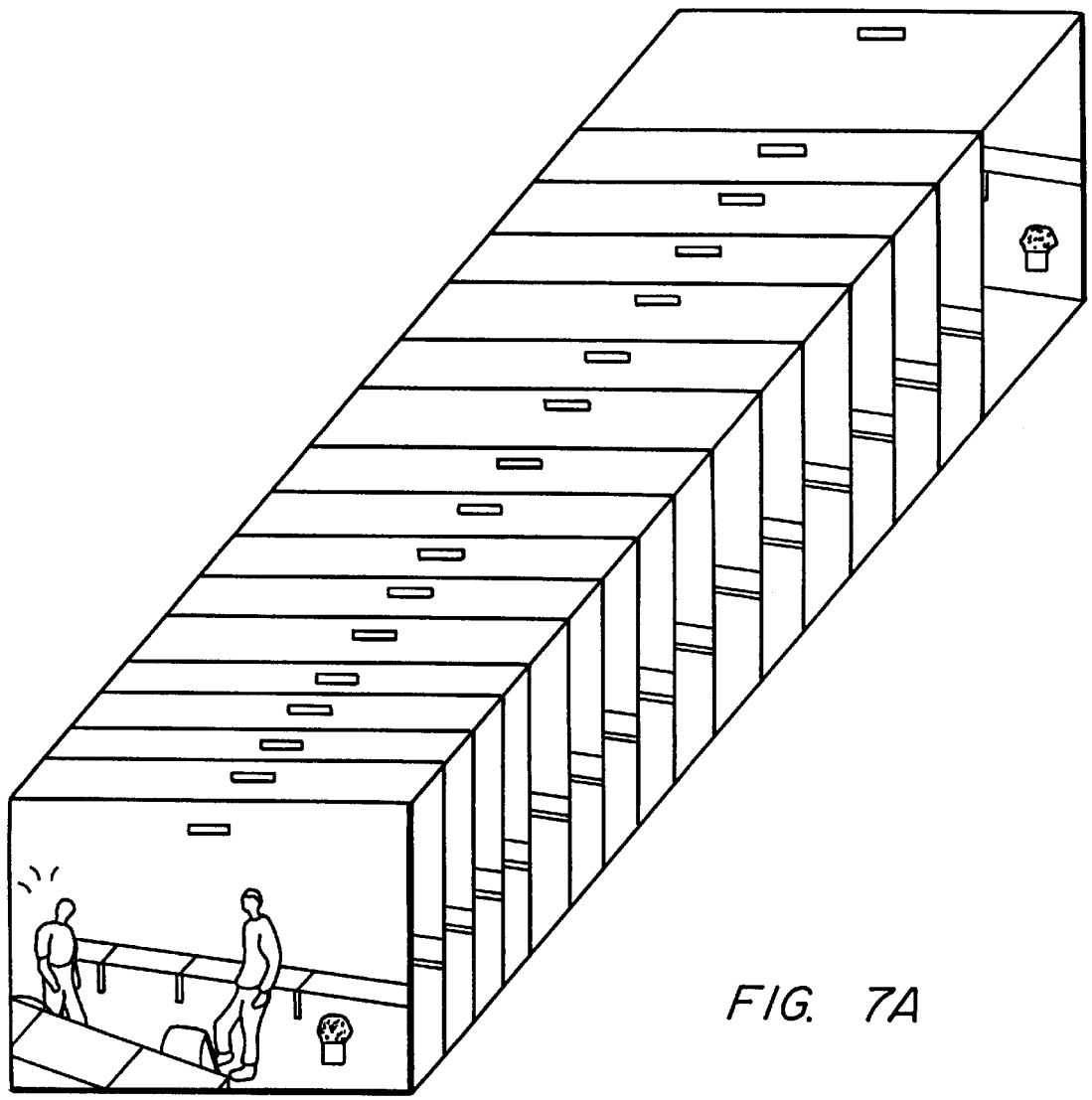
FIG. 7A–B illustrate the effect of user selection of an object represented in the displayed image, in a second embodiment of interface according to the present invention.

FIG. 7A illustrates an initial view presented to a user when he consults the interface for a particular selected video sequence. In this sequence two people walk towards each other and their paths cross. The designer of the interface has decided that the two people are objects that may be of interest to the end user. Accordingly, he has included, in the interface data file, information designating these objects as "extractable". This designation information may correspond to x, y co-ordinate range information identifying the position of the object in each video frame (or a subset of frames).

Figure 7B:
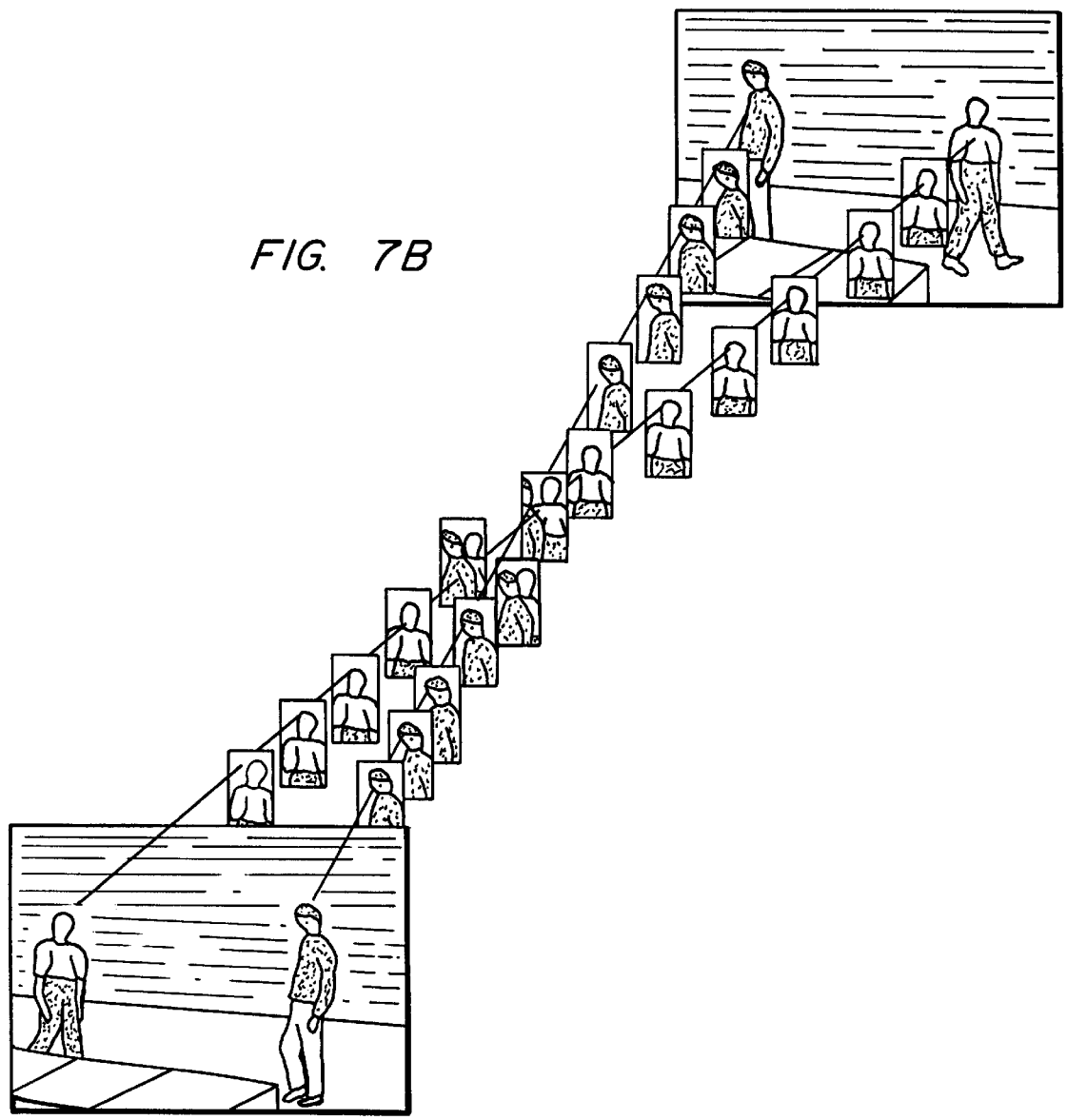

If the user expresses an interest in either of the two objects, for example, by designating a screen position corresponding to one of the objects (e.g. by "clicking" on the left-hand person using the right-hand mouse button), then the interface application program controls the displayed image such that extraneous portions of the displayed frames disappear from the display, leaving only a representation of the two people and their motion, as shown in FIG. 7B. Thus, the objects of interest are "extracted" from their surroundings. The "missing" or transparent portions of the displayed frames can be restored to the displayed image at the user's demand (e.g. by a further "click" of the mouse button).

It is to be understood that, according to the present invention, interfaces may be designed such that particular "extractable" objects may be extracted simultaneously with some or all of the other extractable objects, or they may be extracted individually. Sophisticated interfaces according to the present invention can incorporate object-extraction routines permitting the user to arbitrarily select objects visible in the displayed view of the root image, for extraction. Thus, for example, the user may use a pointing device to create a frame around an object visible in a displayed view of the root image and the application program then provides analysis routines permitting identification of the designated object in the other basic frames of the root image (and, if required, in additional frames) so as to cause display of that selected object as if it were located on transparent frames.

Figure 8:
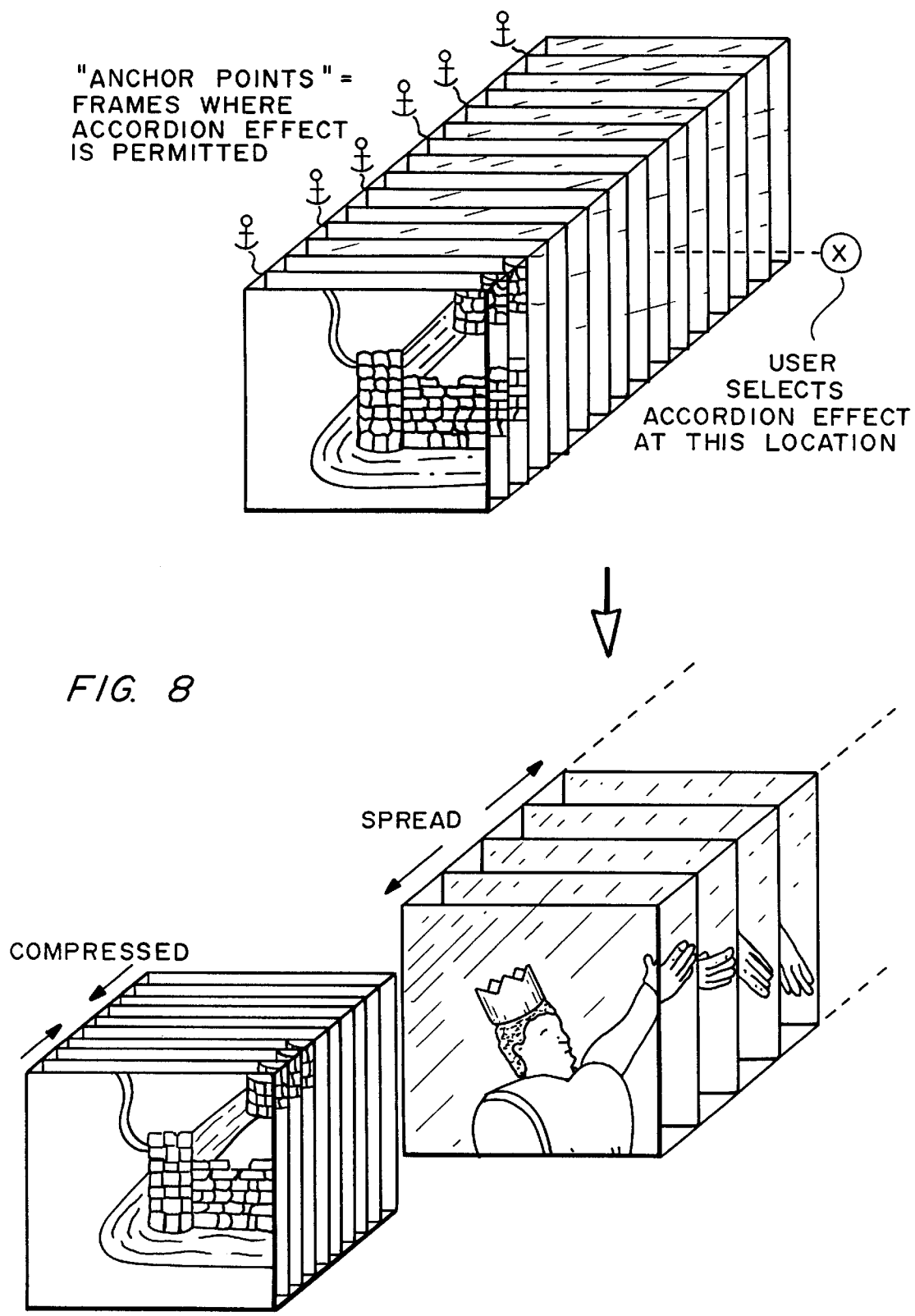
FIG. 8 illustrates a user manipulation of a root image to produce an "according effect"

It may be desirable to allow the user to obtain a close-up view of a particular portion of the interactive video icon in a manner which does not correspond to a strict perspective view of the re-ion concerned. Preferred embodiments of interface according to the invention thus provide a so-called "accordion" effect, as illustrated in FIG. 8. When the user manipulates the icon by an "accordion" effect at a particular point, the basic frames in the vicinity of the region of interest are spread so as to provide the user with a better view. Further, preferably, the function of displaying additional frames so as to increase detail is inhibited during the "accordion" effect.

Figure 9:
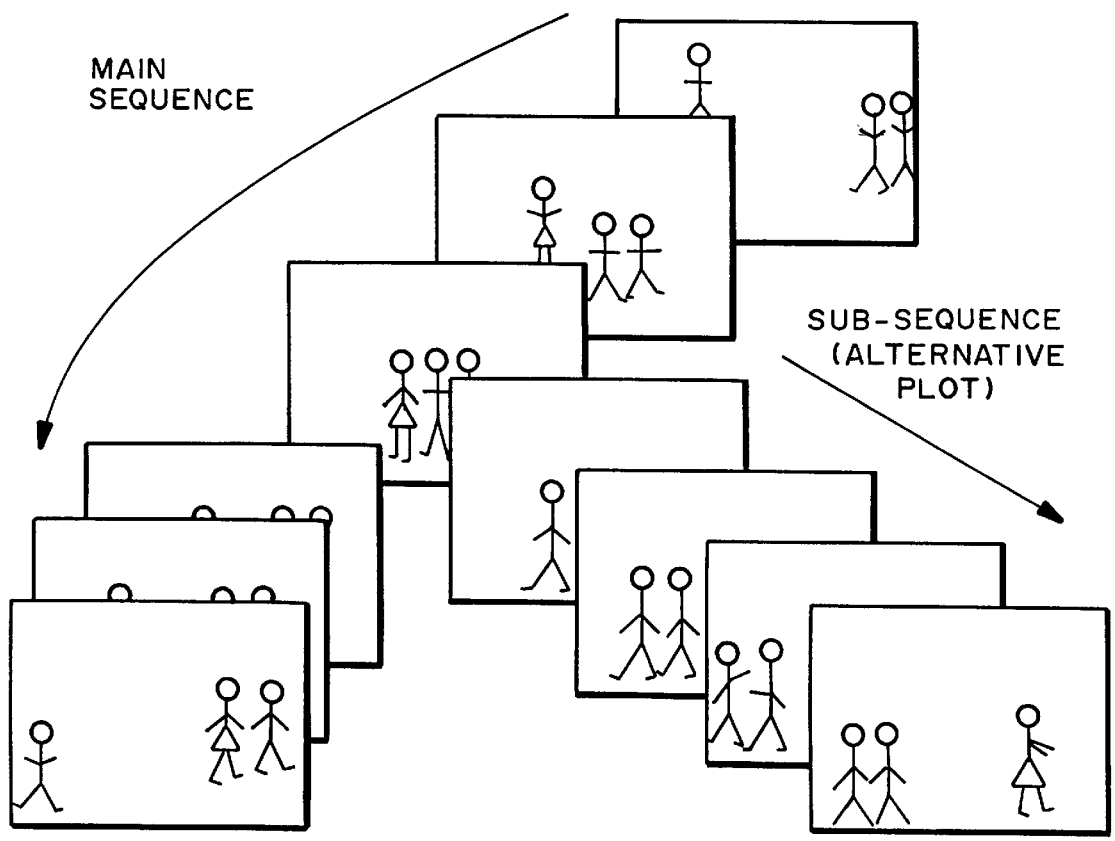
FIG. 9 illustrates a displayed image corresponding to a view of a branching root image associated with a multi-threaded scenario.

In the case of "multi-threaded" video sequences, such as are traditionally found in video-based computer games and educational software and involve parallel video subsequences which are accessed alternatively depending upon the user's choices, these too can be the subject of interfaces according to the present invention. In such a case, the interface designer may choose to include frames from different parallel video subsequences in the interface's root image in order to give the user an idea of the different plot strands available to him in the video sequence. FIG. 9 illustrates an interactive video icon derived from a simple example of such a root image.

Alternatively, or additionally, the designer may create secondary root images for the respective sub-sequences, these secondary root images being used to generate the displayed image only when the user designates a viewing position close to the video frame where the sub-sequence begins. In the case of interfaces to such computer games or educational software, this is a logical choice since it is at the point where the video sub-sequence branches from the main sequence that user choices during playing of the game, or using of the educational software, change the experienced scenario.

Another manipulation which it is preferable to include in interfaces according to the invention is the traditional set of displayed VCR controls which permit the user to playback the video sequence with which the displayed video icon is associated. Furthermore, the user can select for playback portions or frames within the sequence by, for example, "clicking" with the mouse button on the frames of interest as displayed in the interactive video icon. The video playback can take place on a separate display screen or on a window defined on the display screen displaying the video icon.

As mentioned above, a particular video sequence may be associated with an interface data file and a script. The script is a routine defined by the interface designer which leads the user through the use of the interface. The script can, for example, consist of a routine to cause an automatic demonstration of the different manipulations possible of the displayed quasi-object. The user can alter the running of the script in the usual way, for example by pausing it, slowing it down, etc.

The script may, if desired, include additional text, sound or graphic information which can be reproduced in association with the displayed view of the root image either automatically or in response to operations performed by the end user. Script functionality according to the present invention allows creation and editing of viewing scenarios that may be subsequently played, in part or in whole, automatically, or interactively with user inputs. For example, in a completely automatic mode, the user can cause the scenario to begin to play by itself and take the user through the scenario and any associated information by simply reading the scenario and changing the view. In other situations the script may call for interaction by the user, such as to initiate a transaction. In this case the user may be asked to specify information, e.g. if he wants to purchase the video or any other items associated with what has been viewed. In yet other situations the editor may leave visible tags which when activated by the user will cause some information to be displayed on the display device; e.g. associated text, graphics, video, or sound files which are played through the speakers of the display device. In certain cases these tags are attached to objects selected and extracted from the video sequence, such as so-called "hot objects" according to the present invention.

Figure 10:
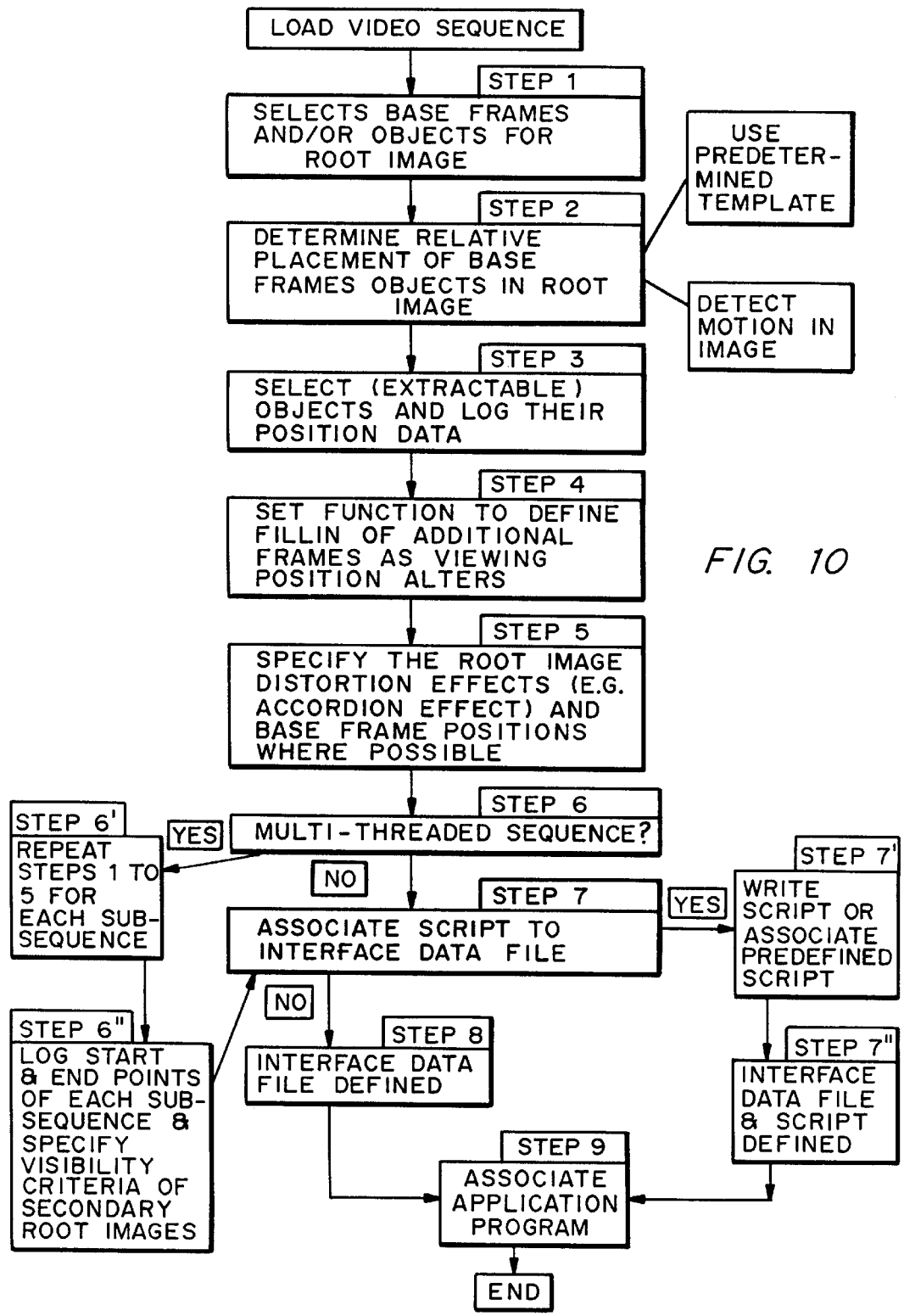
FIG. 10 is a flow diagram indicating steps in a preferred process of designing an interface according to the present invention.

FIG. 10 is a flow diagram illustrating typical stages in the design of an interface according to the present invention, in the case where a designer is involved. It is to be understood that interfaces according to the present invention can also be generated entirely automatically. It will be noted that the designer's choices affect, notably, the content of the interface data file. It is to be understood, also, that not all of the steps illustrated in FIG. 10 are necessarily required—for example, steps concerning creation of secondary root images can be omitted in the case of a video sequence which is not multithreaded. Similarly, it may be desirable to include in the interface design process certain supplementary steps which are not shown in FIG. 10. Thus, for example, it is often desirable to include in the interface data file (as indicated in the example of FIG. 3) information regarding the camera motion, cuts, etc. present in the video sequence. During use of the interface, this information can permit, for example, additional video frames to be added to the displayed image and positioned so as to provide a visual representation of the camera motion. During the interface design process the information on the characteristics of the video sequence can be determined either automatically (using, known cut-detection techniques and the like) and/or may be specified by the interface designer. It may also be desirable to include in the interface data file information which allows the sequence, or scripting for it, to be indexed and retrieved. Preferably, the interface or sequence is accessed using such information applied according to a traditional method, such as standard database query language or through a browser via a channel or network; the interface data may be downloaded in its entirety or fetched on an as needed basis.

The present invention provides toolkitd for use by designers wishing to create an interactive video interface according to the present invention. These toolkits are preferably implemented as a computer program for running on a general purpose computer. The toolkits present the designer with displayed menus and instructions to lead him through a process including steps such as the typical sequence illustrated in FIG. 10.

The designer first of all indicates for which video sequence he desires to create an interface, for example by typing in the name of a stored file containing the video sequence information. Preferably, the toolkit accesses this video sequence information for display in a window on the screen for consultation by the designer during the interface design process. In such preferred embodiments of the toolkit, the designer may make his selection of basic frames/ objects for the root image, extractable objects and the like by stepping slowly through the video sequence and, for example, using a mouse to place a cursor on frames or portions of frames which are of interest. The toolkit logs the frame number (and x, y locations of regions in a frame, where appropriate) of the frames/frame portions indicated by the designer and associates this positional information with the appropriate parameter being defined. Preferably, at the end of the interface design process the designer is presented with a displayed view of the root image for manipulation so that he may determine whether any changes to the interface data file are required.

Different versions of the application program can be associated with the interface data file (and script, if present) depending upon the interface functions which are to be supported. Thus, if no script is associated with the interface data file, the application program does not require routines handling the running of scripts. Similarly, if the interface data file does not permit an accordion effect to be performed by the end user then the application program does not need to include routines required for calculating display information for such effects. If the interface designer believes that the end user is likely already to have an application program suitable for running interfaces according to the present invention then he may choose not to package an application program with the interface data file or else to associate with the interface data file merely information which identifies a suitable version of application program for running this particular interface.

The present invention has been described above in connection with video sequences stored on CD-ROM. It is to be understood that the present invention can be realized in numerous other applications. The content of the interface data file and the elements of the interface which are present at the same location as the end user can vary depending upon the application.

For example, in an application where a video sequence is provided at a web-site, the user may first download via his telecommunications connection just the interface data file applicable to the sequence. If the user does not already have software suitable for handling manipulation of the interactive video icon then he will also download the corresponding application program. As the user manipulates the interactive video icon, any extra image information that he may require which has not already been downloaded can be downloaded in a dynamic fashion as required.

This process can be audited according to the present invention if desired. The user's interaction with the interface can be audited, and he can interact with the transaction/audit functionality for example to supply any information required by a script which may then be recorded and stored. Depending upon the application, the transaction/audit information can be stored and made available for externally (optional) located auditing and transaction processing facilities/applications. In a typical situation, the auditing information can be transmitted at the end of a session whereas the transaction information may be performed on-line, i.e. the transaction information is submitted during the session. Real time transmission can also occur according to the present invention, however.

Another example is the case of a catalogue on CD-ROM including only interfaces rather than the associated video sequences, in order to save space. In such a case, rather than including a pointer to the image information of the basic frames of the root image, the interface data frame includes the image information. Some additional image information may also be provided.

Figure 11:
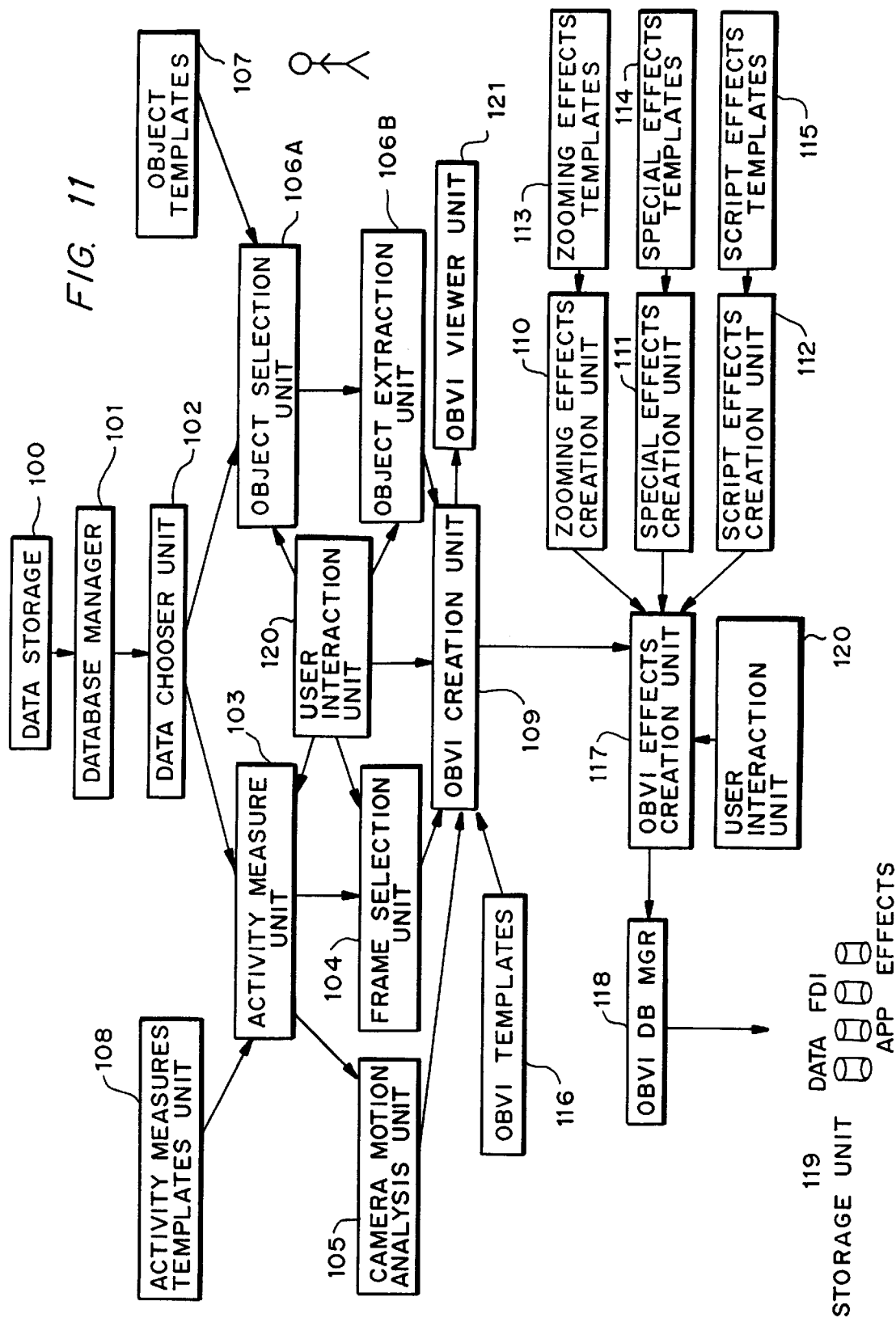
FIG. 11 is a schematic representation of a preferred embodiment of an interface editor unit according to the present invention.
Figure 12:
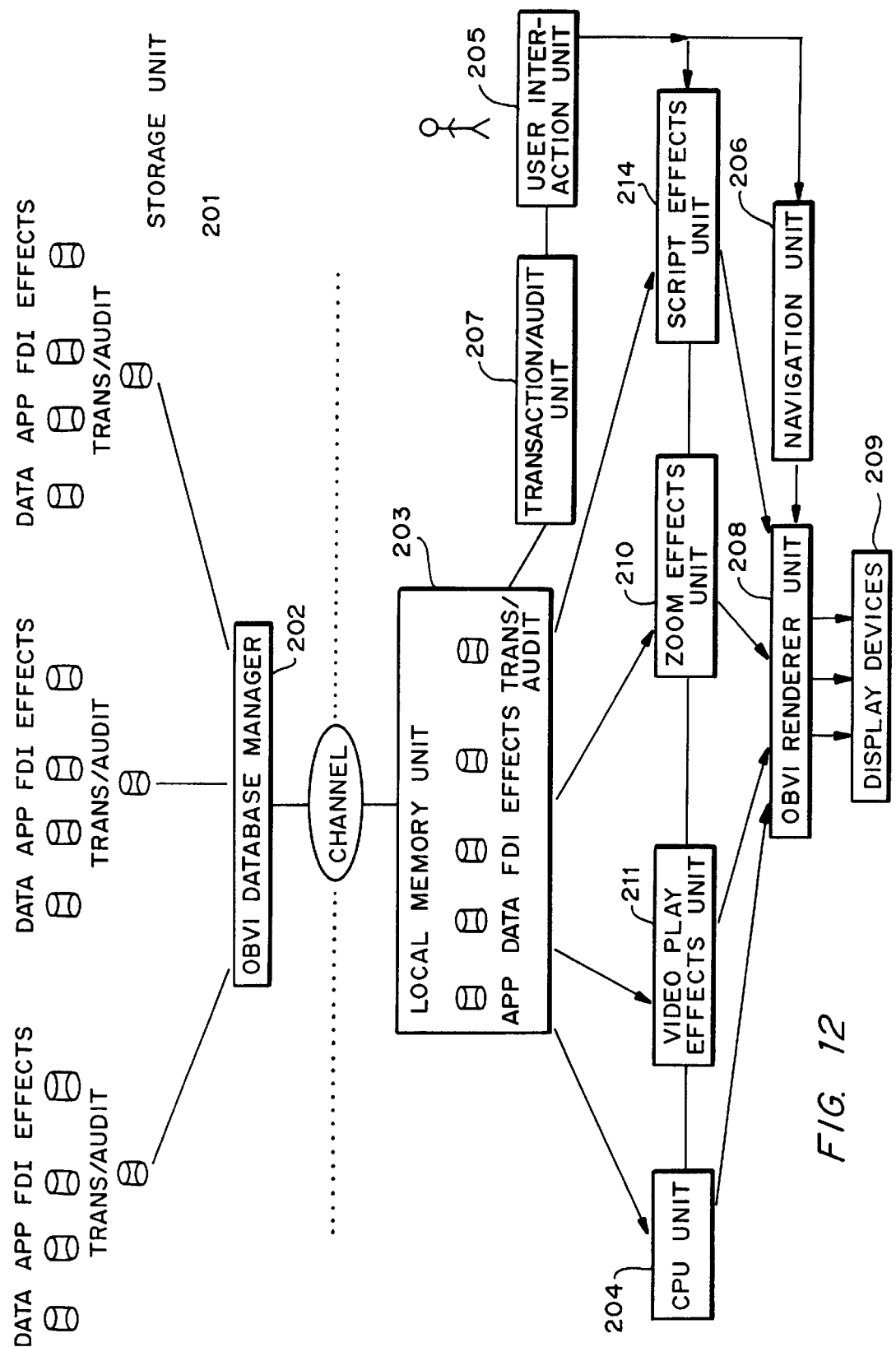
FIG. 12 is a schematic representation of a preferred embodiment of an interface viewer according to the present invention.

The following disclosure relates to a preferred implementation according to the present invention, with reference to FIGS. 11 and 12.

A. Interface Editor Unit

Editors, readers and viewers according to the present invention can be implemented in hardware, hardware/software hybrid, or as software on a dedicated platform, a workstation, a personal computer, or any other hardware. Different units implemented in software run on a CPU or graphics boards or other conventional hardware in a conventional manner, and the various storage devices can be general purpose computer storage devices such as magnetic disks, CD-ROMs, DVD, etc.

With reference to FIG. 11, the editor connects to a database manager (101) and selects a video document and any other documents to be included in the interface by using a data chooser unit (102). The database manager may be implemented in various ways; e.g., as a simple file structure or even as a complete multimedia database. The data storage (100) contains the video data and any other information/documents required and can be implemented in various modes; e.g., in a simple stand-alone mode of operation it could be a CD-ROM or in a networked application it could be implemented as a bank of video servers. Typically the user operating through the user interaction unit (120) is first presented a list of available videos or uses a standard database query language to choose the desired video and then chooses any other documents required.

The creation of an interface using the editor is discussed below in three phases: (1) Analysis, (2) Visual layout and (3) Effects creation.

1. Analysis.

The video document chosen by the editor is first processed by the activity measure unit (103). The activity measure unit is responsible for computing various parameters related to the motion and changes in the video. This unit typically will implement one of a number of known techniques for measuring changes, e.g., by calculating the statistics of the differences between frames, by tracking objects in motion, or by estimating camera motions by separating foreground and background portions of the image. In other implementations this unit may use motion vector information stored in an MPEG-encoded sequence to detect important frames of activity in the video document. The activity measures template store is optional but would contain templates which can be used to calculate the frame ranking measure and could be specified by the user through the user interaction unit.

These parameters are then used to calculate a frame ranking measure which ranks the different frames as to whether they should be included in the interface. The frame ranking measure is derived heuristically from these measures [e.g., by normalizing the values and taking an average of the parameters, and can be tailored for different kinds of sequences (traveling shots, single objects in motion, etc) or applications]. The editor may choose a pre-defined set of parameters from the activity measures template store (108) to detect or highlight a specific kind of activity (rapid motion, abrupt changes, accelerations, etc.)

The frame ranking measures can be employed by the user acting through the user interaction unit on the frame selection unit (104) to select the frames to be included within the interface. For example, if 10 frames are to be included in the interface then in default mode the 10 frames corresponding to the 10 largest frame making measures are selected for inclusion in the interface. The user can then interactively de-select some of these frames and add other frames.

Figure 1A:
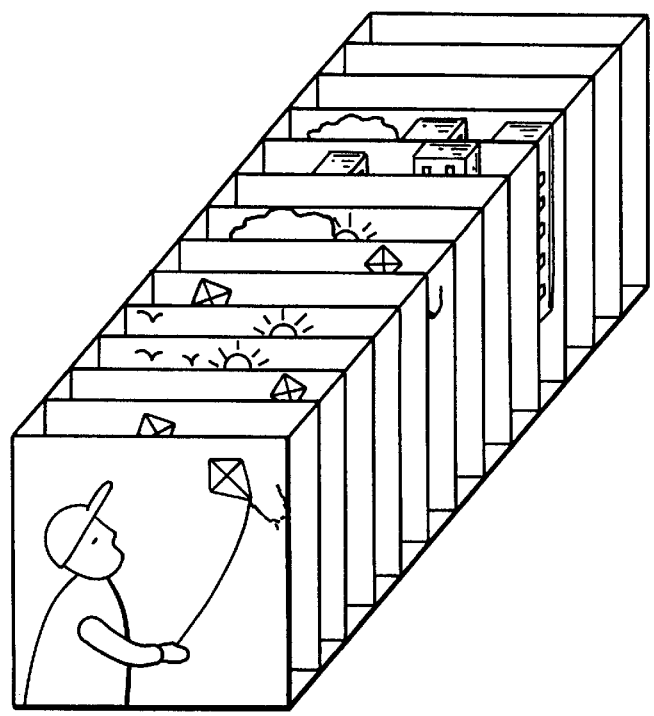
Figure 1B:
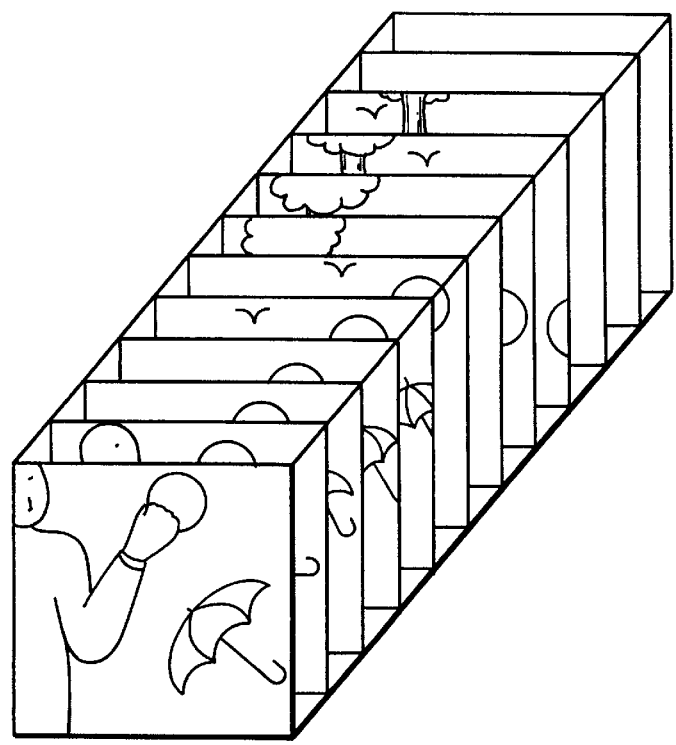
Figure 1C:
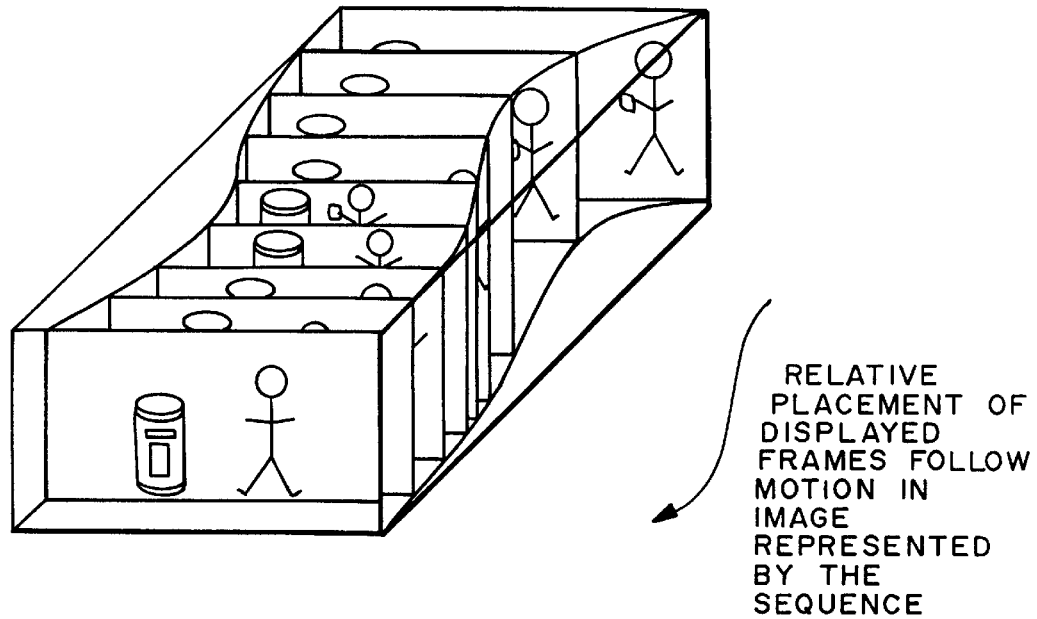

The camera motion analysis unit (105) is an optional unit which typically will implement one of a number of known techniques for measuring camera motion parameters. This information can be used to determine what shape to give to the outer envelope of the interface as shown in FIG. 1C; a default shape, stored in the interface template store (116) can be chosen. This information may be optionally stored in the FDI file.

The object selection unit (106A) is responsible for selecting or detecting individual objects in the video document. There are various modes possible: in a completely manual mode the editor may visually select and outline an object of interest in a given frame through the user interaction unit (120); in a semi-manual mode, the editor simply points at an object and chooses from the object templates store (107) features and associated algorithms to use for extracting and tracking the chosen object; in another mode the editor may chose one of a set of pre-defined templates of objects and known pattern matching techniques are used to detect whether any objects of interest are preset. The user may even assign a name/identifier to the object and add the object to the object templates store (107). In this latter case searches for multiple occurrences of the same object can be initiated by the user. The information regarding the properties of the object may be optionally stored in the FDI file.

The object extraction and tracking unit (106B) is now responsible for extracting the object of interest from the frame and then tracking it by using known tracking algorithms. The algorithms used are either chosen by the user or by default. It is understood that the object selecting, detection, extraction, and tracking process may be highly interactive and that the user may be called upon or choose to intervene in the process a number of times. The information about the presence and location of objects may be optionally stored in the FDI file.

In certain applications the FDI file can be made available to an external program, for example when the interface editor is associated with an indexing program, the task of which is to attach indexes (identifiers) to the video documents, to portions thereof, or to objects located within the video document.

2. Visual Layout

The user acting through the user interaction unit (120) on the interface creation unit (109) determines the visual layout of the interface.

He can shape the outer envelope of the interface in any way that he desires; two examples are provided in FIGS. 6 and 9; in particular, multiple sequences can be concentrated and so implement branching effects representing alternatives to the user. Default shapes are stored in the interface template store (116). The user can also choose to vary the spacing of the frames seen on the interface; that is the distance between frames of the interface as perceived on the display unit. The user can also insert selections of the extracted and tracked objects from unit (106B) as illustrated in FIG. 7B. In this case, the corresponding frames are rendered transparent except at the locations of the objects.

The different pieces of information generated by the units described above are gathered together by the interface creation unit (109) into an FDI file containing a description of the interface in terms of its layout i.e. shape and structure, the image frame numbers and their positions, and if available, the extracted features the ranking of the frames and the camera motion information. This information is transmitted to the interface effects creation unit (117).

3. Effects Creation

The editor can also specify three classes of interface features which serve to convey additional information to the user and which allow the user to interact with the interface. The editor performs this specification through the interface effects creation unit (117).

The zooming effects creation unit (110) is used by the editor to specify which frames will be made visible, and also which will be rendered invisible to the user when he moves up closer to the interface (FIG. 5B) so as to view it from a new viewing position. The choice of frames to add depends upon factors such as, the distance of the viewing point from the interface, the degree of motion, the degree of scene change, the number of frames that can be made visible and optionally the frame ranking measures calculated by the activity measure unit (103). The editor can choose to use one or more of the default zooming effect templates contained in the zooming effect templates store (113) and assign these in a differential manner to different parts of the interface; alternatively the editor can choose to modify these templates and apply them differentially to the interface.

The special effects creation unit (111) is used by the editor to create special visual effects on the interface. One such example is the accordion effect illustrated in FIG. 8 where parts of the interface are compressed and other parts are expanded. Another example is illustrated in FIG. 7A and 7B where the editor has designated an extractable object and which is then shown in its extracted form; in other words, the background is removed. The editor creates the scripts by calling up templates from the specific effects templates store (114) and instantiating them by defining the positions where the special effect is to take place and by setting the appropriate parameters.

The script effects creation unit (113) allows the editor of the interface to build an interface viewing scenario that may be subsequently be played, in part or in whole, automatically, or interactively with user inputs. For example, in a completely automatic mode when the user calls up the interface it begins to play by itself and takes the user through the interface and any associated information by simply reading the scenario and changing the view of the interface. In other situations the script may call for the user to interact with the interface, e.g. to initiate a transaction. In this case the user may be asked to specify information, e.g. if he wants to purchase the video or any other items associated with the interface. In yet other situations the editor may leave visible tags which when activated by the user will cause some information to be displayed on the display device; e.g. associated text, graphics, video, or sound files which are played through the speakers of the display device. In certain cases these tags are attached to objects selected and extracted from the video sequence by units 6A and 6B and become so-called "hot object." The editor creates the scripts by calling up templates from the script effects templates store (115) and instantiating them by defining the tag and the locations of the information to be called up.

The interface effects creation unit (117) creates 4 files which are passed to the interface database manager (118) which will store these files either remotely or locally as the case may be: (1) The FDI file, completed by the special effect and script tags, text and graphics which have been added to the interface and which are directly visible to the user. (2) The zoom effect details, scripts and special effects. (3) The application programs (optional) to view the interface; i.e., allow the user to view the interface from different perspectives, traverse the interface, run the script, perform the special effects, or coded information which indicate which application program residing on the users machine can be used to perform these operations. (4) The video sequence and any other associated information (data) required for reading the interface.

These files are shown stored in storage unit (119) but depending upon the embodiment they may be physically located in the same storage device, in separate storage devices (as shown) either locally (as shown) or remotely.

During the editing process, the user/editor can view the interface under construction, according to the current set of parameters, templates and designer preferences, on the interface viewer unit (121) (presented in FIG. 12 and described below), thus allowing the editor to interactively change its appearance and features.

B. Interface Viewer Unit

Having chosen an interface through a traditional method, for example by using a database query language or by using a browser such as are used for viewing data on the Web, the interface viewer unit is then employed to read and interact with the interface.

In a typical application the storage units (201) are remotely located and accessed through the interface database manager (202) by way of a communication channel or network; depending upon the size and characteristics of the channel and the application the interface data may be loaded in its entirety or fetched on a as need basis.

The data are then stored in a local memory unit (203) which may be either a cache memory, a disk store or any other writable storage element. The local memory unit (203) stores the 4 files created by the editor (see above) and in addition a transaction/audit file. In certain cases the applications programs are already resident in the interface viewer unit and so do not need to be transmitted.

The CPU unit (204) fetches the application program, deduces which actions need to be performed, and then fetches the relevant interface information contained in the local memory unit (203). Typically the CPU unit fetches the required application program for the user interaction unit (205), the navigation unit (206), and the transaction/audit unit (207), then interface information is read from the local memory unit (203) passed to the interface renderer unit (208) which then calculates how the interface is to appear or be rendered for viewing on the display device (209).

The user interacts with the interface through the user interaction unit (205) to the navigation unit (206) and all his actions are audited by the transaction/audit unit (207). In addition, the user can interact with the transaction/audit unit (207) for example to supply any information required by the script which is then recorded and stored in the transaction/ audit portion of the local memory unit (203). Depending upon the application, this transaction/audit file or a portion thereof is transmitted by the interface database manager to the appropriate storage unit (201). This information is then available for externally (optional) located auditing and transaction processing facilities/applications. In a typical situation, the auditing information is transmitted at the end of the session whereas the transaction information may be performed on-line, i.e. the transaction information is submitted during the session.

Through the navigation unit (206) the user can choose the point of view from which to view the interface (or a portion of the interface). The interface rendered unit (208) then calculates how the interface is to appear or be rendered for viewing on the display device (209).

If the user chooses to zoom in or zoom out, then the zoom effects unit (210) fetches the required application program, reads the zoom effect parameters stored in the local memory store (203), determines the frames to be dropped or added and supplies this information (including the additional frames if needed) to interface renderer unit (208) which then calculates how the interface is to appear or be rendered for viewing on the display device (209).

If the user chooses to view part of the underlying video then the video play effects unit (211), fetches the required application program, then reads the required video data from the local memory unit (203) and plays the video on a second display device (209) or in a new window if only one display device is available.

If the user chooses to interact with a hot pre-extracted object (created by the special effects unit), then the special effects unit (212), fetches the required application program, reads the locations of the object and the corresponding frames are modified so as to be transparent wherever the objects do not occur; the new frames are passed to interface renderer unit (208) which then calculates how the interface is to appear or be rendered for viewing on the display device (209). In cases where the extracted object is to be played as a video the frames are passed to the video effects unit (211) which then plays the video on a second display device (209) or in a new window if only one display device is available. Similarly if the user chooses to view an accordion effect then the special effects unit fetches the accordion effect store (203), determines the frames to be dropped or added and calculates parameters stored in the local memory the relative position of all the frames and supplies this information (including the additional frames if needed) to interface renderer unit (208) which then calculates how the interface is to appear or be rendered for viewing on the display device (209).

If the user designates a tag created by the script then the script effects unit (214) fetches the required application program, reads the corresponding portion of the script and the related information required to carry out the portion of the script associated with the tag designated. If the interface is to be played in automatic mode then the script effects unit (214) fetches the entire script and all the related information required to carry out the script. When needed the zoom effects unit (210), the video play unit (211), and the special effects unit (212) may be called into play. If the script calls for user input such as required for carrying out a transaction, then a new window may be opened on the display device (or on a second display device) where the information is supplied and transmitted to the transaction/audit unit (207). In semi-automatic mode control of the viewing of the interface is passed between the script effects unit (214) and the navigation as instructed by the user through the user interaction unit (205). Although the above-discussed preferred embodiments of the present invention present certain combinations of features, it is to be understood that the present invention is not limited to the details of these particular examples. Firstly, since image processing is performed on image data in digital form, it is to be understood that in the case where the video sequence consists of data in analogue form, an analogue-to digital converter or the like will be used in order to provide image data in a form suitable for processing. It is to be understood that the present invention can be used to create interfaces to video sequences where the video data is in compressed form, encrypted, etc. Secondly, references above to user input or user selection processes cover the use of any input device whatsoever operable by the user including, but not limited to, a keyboard, a mouse (or other pointing, device), a touch screen or panel, glove input devices, detectors of eye movements, voice actuated devices, etc. Thirdly, references above to "displays" cover the use of numerous different devices such as, but not limited to, conventional monitor screens, liquid crystal displays, etc.

Furthermore, for ease of comprehension the above discussion describes interfaces according to the present invention in which the respective root images each have a single characteristic feature, such as, giving a visual representation of motion, or giving a visual representation of zoom, or having a multi-threaded structure, etc. It is to be understood that a single root image can combine several of these features, as desired. Similarly, special effects such as object extraction, the accordion effect, etc. have been described separately. Again, it is to be understood that interfaces according to the invention can be designed to permit any desired combination of special effects.

What is claimed is:

1. An interface to an associated video sequence, the interface comprising:
   a) information defining a three-dimensional root image, the root image consisting of a plurality of basic frames selected from said video sequence, and/or a plurality of portions of video frames corresponding to selected objects represented in the video sequence, x and y directions in the root image corresponding, to x and y directions in the video frames and the z direction in the root image corresponding to the time axis whereby the basic frames are spaced apart from one another in the z direction of the root image by distances corresponding to the time separation between the respective video frames;
   b) means for displaying views of the root image;
   c) means for designating a viewing position relative to said root image; and
   d) means for calculating image data representing said three-dimensional root image viewed from the designated viewing, position, and for outputting said calculated image data to the displaying means.

2. An interactive interface according to claim 1, wherein the designating means is user-operable means for designating a viewing position relative to a displayed representation of the root image.

3. An interactive interface according to claim 1 wherein the means for calculating image data for display is adapted to include in the calculated output image data, dependent upon the designated viewing position, image data corresponding to portions of basic frames which are not visible in the reference view of the root image.

4. An interface according to claim 1 wherein the means for calculating image data for display is adapted to include in the calculated image data, dependent upon the distance between the designated viewing position and the root image, image data from frames of the video sequence additional to the basic frames.

5. An interactive interface according to claim 4 wherein the means for calculating image data for display is adapted to select for use in calculating the image for display additional frames chosen based upon criteria specified in additional information stored in association with the root image definition.

6. An interface according to claim 1, wherein the means for calculating image data for display is adapted to calculate output image data corresponding to a different number of frames and/or a displayed image of enlarged or reduced size, dependent upon the distance between the user-designated viewing position and the root image.

7. An interface according to any previous claim, wherein the video sequence includes image data representing one or more selected objects, the means for calculating image data for display being adapted, for each displayed frame containing a respective selected object, selectively to output image data causing display of only that image data which corresponds to the selected object(s), causing, the remainder of the respective displayed frame to appear transparent.

8. An interface according to claim 7, wherein there is provided means for the user to select objects represented in the displayed image, and wherein the means for calculating image data for display is adapted to output image data causing portions of frames to appear transparent in response to the selection of objects by the user.

9. An interface according to any one of claims 1–5 or 8 for a video sequence comprising a main sequence of video frames and at least one additional subsequence of video frames constituting an alternative path to or from a particular video frame in the main sequence, wherein the user can access image information relating to an alternative sub-sequence by designating a viewing position close to a point in the root image corresponding to said particular video frame, the means for calculating image data for display being adapted to graft on to the displayed view of the root image, at the branching point, a secondary root image representing said alternative sub-sequence.

10. An interactive interface according to claim 9, wherein by operation of the viewing position designating means the user can navigate through root images and secondary root images corresponding to the different possible scenarios contained in the video sequence.

11. Apparatus for creation of an interface to a video sequence, the apparatus comprising:
   a) means for accessing image information in digital form representing a video sequence;
   b) means for creating a root image representing the video sequence, the root image creation means comprising:
      i) means for selecting a sub-set of frames from the video sequence, or portions of said sub-set which correspond to objects represented in the video sequence, to serve as basic frames of the root image; and
      ii) means for setting the relative placement positions of the basic frames in the root image, and
   c) means for associating with the root image routines for changing the displayed view of the root image depending upon a designated viewing position relative to the root image.

12. Apparatus according to claim 11 and further comprising means for identification of objects represented in the image information of the video sequence and for designating objects as selectable by an end user.

13. Apparatus according to claim 11 wherein the means for setting the relative placement positions of the basic frames in the root image comprises means for accessing stored information representing a plurality of templates and means for inputting selection information designating one of the stored templates.

14. Apparatus according to claim 11 wherein the means for setting the relative placement positions of the basic frames in the root image comprises means for detecting motion in the video sequence and means for placing the basic frames within the root image in relative positions which provide a visual representation of said motion.

15. Apparatus according to claim 14 wherein the means for placing the basic frames within the root image is adapted to effect a progressive change in the dimensions of the basic frames in the root image in order to visually represent a zoom-in or zoom-out operation.

16. Apparatus according to claim 11, wherein the means for selecting a sub-set of frames from the video sequence to serve as basic frames of the root image is adapted to select frames as a function of the rate of change of back-round information in the image.

17. Apparatus according to claim 11, and comprising means for inputting parameters constraining the ways in which the displayed view of the root image can be changed depending upon a user-designated viewing position, the constraint parameters being assimilated into the routines associated with the root image by the associating means.

18. Apparatus according to claim 17 wherein the constraint parameter inputting means is adapted to input data identifying the rate at which additional frames should be included in a displayed view of the root image when a user-designated viewing position approaches the root image.

19. Apparatus according to claim 11, and comprising means for creating secondary root images corresponding to additional sub-sequences of video frames constituting alternative paths to or from a particular video frame in the main video sequence.

20. A process for creating an interface corresponding to a predetermined video sequence, comprising the steps of:
   a) retrieving the video sequence from a data store;
   b) analyzing data corresponding to at least some frames of the video sequence based upon at least one predetermined algorithm;
   c) selecting at least some frames from the video sequence based at least in part on frame ranking measure parameters stored in a frame ranking template store;
   d) arranging the selected frames to form a succession of frames defining at least in part the interface; and
   e) transferring data corresponding to said selected and arranged frames to an interface store.

21. A process according to claim 20 in which said step of selection is conducted automatically.

22. A process according to claim 20 in which said step of selection is conducted at least in part manually.

23. A process according to claim 20 in which said step of selection is based at least in part on the degree of motion of objects in the frames.

24. A process according to claim 20 in which said step of selection is based at least in part on estimating camera motion by separating foreground and background portions of the images.

25. A process according to claim 20 in which said step of selection is based at least in part on vector data in the digital representation of images in the frames.

26. A process according to claim 20 further comprising the steps of:
a) analyzing data corresponding to at least some frames of the video sequence in order to evaluate objects within said frames;
b) selecting at least one object from a plurality of the frames;
c) selecting at least some frames from the video sequence based at least in part on said at least one object;
d) tracking said at least one object through the selected frames; and
e) arranging the selected frames based at least in part on said at least one object.

27. A process according to claim 26 in which said step of selecting said at least one object is conducted automatically.

28. A process according to claim 26 in which said step of selecting said at least one object is conducted at least in part manually.

29. A process according to claim 20 further comprising the steps of:
a) arranging the selected frames to form a succession of frames defining at least in part the interface;
b) selecting at least one additional frame to add to the succession of frames corresponding to a new viewing position based at least in part on certain predetermined factors; and
c) selecting at least one frame to remove from the succession of frames corresponding to a new viewing position based at least in part on certain predetermined factors.

30. A process according to claim 29 in which said step of selecting at least one additional frame to add is conducted automatically.

31. A process according to claim 29 in which said step of selecting at least one additional frame to add is conducted at least in part manually.

32. A process according to claim 29 in which said step of selecting at least one additional frame to remove is conducted automatically.

33. A process according to claim 29 in which said step of selecting at least one additional frame to remove is conducted at least in part manually.

34. A process according to claim 20 further comprising the steps of:
a) arranging the selected frames based at least in part on user specified criteria; and
b) calculating the arrangement of the selected frames based at least in part on predetermined algorithms.

35. A process according to claim 20 further comprising the steps of:
a) creating an interface data file which contains data corresponding at least in part to said interface; and
b) storing said interface data file in a data store.

36. A process according to claim 20 comprising the further steps of:
a) creating a effects detail file which contains data corresponding to the said selection and arrangement of the selected frames; and
b) storing said effects detail file in a data store.

37. A process according to claim 20 comprising the further steps of:
a) creating a video sequence file which contains data corresponding to the selected frames; and
b) storing said video sequence file in a data store.

38. A process according to claim 20 comprising the further steps of:
a) extracting a predetermined set of information from the said interface;
b) creating a script file consisting at least in part of said predetermined set of information; and
c) storing the said script file in a data store.

39. A method for processing an interface corresponding to a predetermined video sequence, comprising the steps of:
a) retrieving the video sequence from a data store;
b) analyzing data corresponding to at least some frames of the video sequence based upon at least one predetermined algorithm;
c) selecting at least some frames from the video sequence based at least in part on frame ranking measure parameters stored in a frame ranking template store;
d) arranging the selected frames to form a succession of frames defining at least in part the interface; and
e) transferring data capable of generating at least one image corresponding to said succession of frames to a viewer;
f) generating an image from a desired perspective using said data capable of generating at least one image; and
g) displaying said image on a display device.

40. A method according to claim 39 further comprising the steps of:
a) generating an image from a second desired perspective using said data capable of generating at least one image; and
b) displaying said image on a display device.

41. A method according to claim 39 in which the step of generating an image from a desired perspective using said data capable of generating at least one image comprises the steps of:
a) determining frames in the interface to dropped or added;
b) calculating the position of all frames relative to each other; and
c) generating an image that renders said frames positioned appropriately relative to each other and that takes into account the predetermined perspective.

* * * * *